United States Patent [19]

Hopkins et al.

[11] 4,210,780

[45] Jul. 1, 1980

[54] MULTIPLE ACCESS DIGITAL COMMUNICATIONS SYSTEM

[75] Inventors: Gregory T. Hopkins, Chelmsford, Mass.; Paul E. Wagner, Nashua, N.H.

[73] Assignee: The Mitre Corporation, Bedford, Mass.

[21] Appl. No.: 890,479

[22] Filed: Mar. 27, 1978

[51] Int. Cl.$^2$ ................................................ H04J 6/02
[52] U.S. Cl. ...................................... 370/80; 370/85; 370/86
[58] Field of Search .......... 179/15 BA, 15 AL, 2.5 R; 178/58 R; 325/4; 364/200, 900

[56] References Cited

U.S. PATENT DOCUMENTS

| | | | |
|---|---|---|---|
| 3,922,496 | 11/1975 | Gabbard | 325/4 |
| 3,958,083 | 5/1976 | Hara | 325/4 |
| 3,958,226 | 5/1976 | Kuroda | 179/15 AL |
| 4,063,220 | 12/1977 | Metcalf | 340/147 LP |
| 4,090,036 | 5/1978 | Stott | 325/4 |
| 4,096,355 | 1/1978 | Rothauser | 179/15 AL |
| 4,115,661 | 9/1978 | Schmidt | 325/4 |

Primary Examiner—David L. Stewart
Attorney, Agent, or Firm—Kenway & Jenney

[57] ABSTRACT

An unslotted radio frequency multiple access bus communications system employing a contention listen-while-talk (LWT) protocol. The system includes a plurality of remotely located terminals coupled to a communications bus. The bus includes a pair of oppositely directed, unidirectional signal paths which are connected at one end so that one path is an inbound path to that end and the second is an outbound path from that end. Each of the remote terminals includes a bus interface unit (BIU) coupled to both the inbound and outbound paths at the remote location. Each BIU is adapted to transmit and receive modulated carrier signals on the inbound and outbound paths, respectively.

When a terminal wishes to send a message to another terminal, the terminal's BIU initially performs an rf carrier sensing operation to make an initial determination as to whether or not any other subscriber is transmitting on the inbound path. In the event no carrier is detected, the BIU confirms this determination by first beginning to transmit a message packet modulated on a carrier signal and addressed to the desired receiving terminal on the inbound path, and then monitoring the outbound path during a collision window. If the transmitted message is received intact by the transmitting terminal within this collision window, the transmitting terminal's BIU determines that no collision has taken place between its message and a message sent by another terminal or noise, and that the transmitting terminal has gained access to the bus. Thereafter, the BIU may transmit any remaining portion of its message packet on the inbound path. However, in the event a collision is detected, the transmitting terminal's BIU aborts its transmission and then backs off for a random time period before again attempting to gain access to the bus and transmit its message.

14 Claims, 17 Drawing Figures

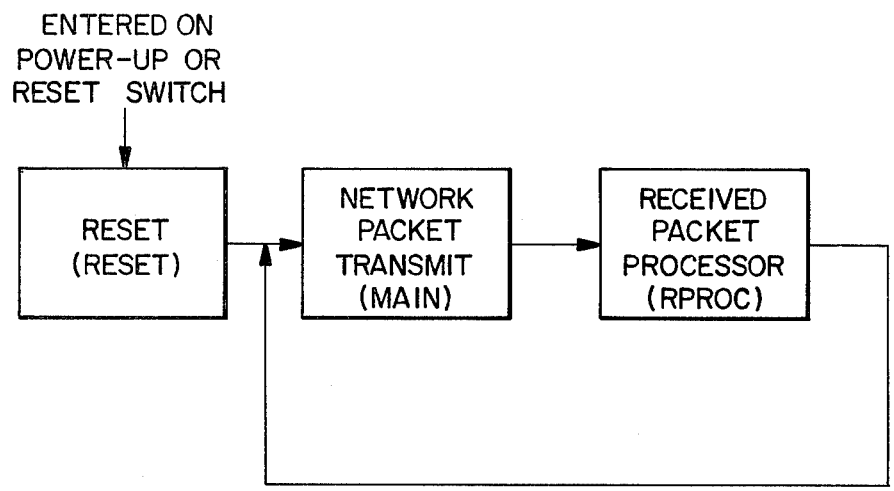
FIG. 6A
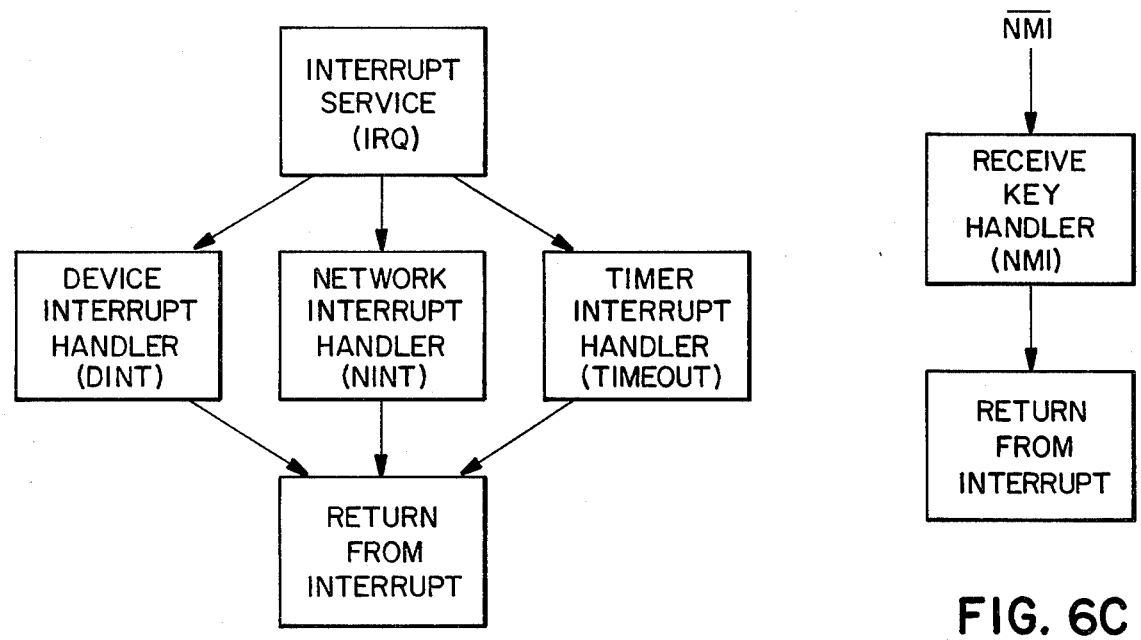
FIG. 6B
FIG. 6C

MULTIPLE ACCESS DIGITAL COMMUNICATIONS SYSTEM

BACKGROUND OF THE INVENTION

The present invention relates to communications systems, and more particularly, to time division, multiple access digital bus communications systems.

The need for the efficient interconnection of computers and computer-related devices has become increasingly apparent with the development of computer technology. In particular, multi-processor systems typically include a number of computers, often widely distributed, which are interconnected by a data bus to remote subscriber terminals and associated peripheral devices. With the developing technology, such terminals and devices have become diverse and capable of wide distribution. The interconnection between such devices has become critical to the system use and performance, particularly in view of the need for adequate digital communication bandwidth, fast response time, high reliability, and the requirement for full access to all coupled but physically distributed devices. Conventional systems typically utilized circuit and message switching techniques. In addition, packet switching techniques have been utilized, although such systems have required relatively expensive store and forward nodes, which raise cost and reliability problems.

Primarily, the conventional time division multiple access (TDMA) bus communications systems have relied on time slotting and assignments of these slots to transmitting subscribers, either permanently or at sign-on to the TDMA system. For example, see U.S. Pat. No. 3,851,104, Willard, et al. While such systems are efficient for a population of high duty cycle traffic, large numbers of low duty cycle users, such as intercommunicating computers, quickly overburden many of the prior art TDMA systems having slots uniquely assigned to various subscribers.

In view of this problem, bus contention protocols have been developed to more efficiently utilize the available bandwidth for computer and terminal communications. Generally, contention systems permit a user to gain access to the entire channel bandwidth for his message burst. In operation, a user having a message to send is permitted to transmit his message whenever he is ready. In the event another user is presently transmitting over the channel, or does so during the first user's transmission, then a message collision occurs. The system users must sense these collisions and, in response, retransmit their respective messages. Some systems provide random delays before retransmissions to avoid "butting", i.e. continual collisions between users.

The contention protocols take advantage of the low duty cycle or "bursty" nature of data being transmitted from terminals and computers. For a large subscriber population of bursty users, the law of large numbers ensures that the channel bandwidth is only required to match the average aggregate data transmission rate of the entire population, rather than matching the sum of the peak rates for bursty subscribers as in the noncontention systems.

Several approaches to the contention protocol have been developed in the prior art. For example, the ALOHA system (see N. Abrahamson "The ALOHA System—Another Alternative For Computer Communications", 1970 Fall Joint Computer Conference, AFIPS Conf. Proc. Vol. 37, AFIPS Press, 1970), describes an unslotted system wherein a plurality of remote stations are connected to a central station by way of a single radio channel. The various remote stations contend for the channel and transmit complete packets of data. In this unslotted configuration, the data packets are not synchronized between stations. When a collision is detected by failure to receive an acknowledgement from the central station, each of the transmitting terminals then retransmits its packet. With this configuration, the ALOHA system is relatively efficient for bursty terminals (e.g. a terminal duty cycle on the order of 1%), compared with a system using separate channels for each station. However, a collision detected during a packet transmission results in the waste of the entire overlapping transmission intervals for the terminals (i.e. as much as two packet lengths), limiting maximum efficiency.

Slotted (i.e. systems where the transmitted packets are synchronized from terminal to terminal) ALOHA systems have been suggested to provide an improvement in efficiency compared with unslotted ALOHA systems. In the latter configuration, the channel is divided into time slots of duration equal to the fixed data packet length. Each user is constrained to begin transmission of a data packet at the start of any time slot. When a collision occurs during a slot, the wasted time is equal to a single packet length, resulting in a substantially higher efficiency than the unslotted system.

Another form of slotted, contention protocol communications system is disclosed in U.S. patent application Ser. No. 881,704, assigned to the assignee of the present application.

An unslotted, listen-while-talk (LWT), protocol, baseband communications system is disclosed in U.S. Pat. No. 4,063,220. This system includes a plurality of remote terminals coupled to a two-way communications medium. Prior to transmission, a terminal monitors the medium to detect activity (i.e. to sense whether the medium is currently busy). If the medium is busy, the terminal must defer at least until the current user is finished and the medium is no longer busy. If any terminal determines that the medium is not presently busy, that terminal may attempt to transmit on the medium.

As a user transmits his message, he also monitors the medium. If the user does not detect any errors in his own transmission for the duration of the end-to-end propagation delay along the medium, then he determines that he has gained sole access to the medium and will successfully complete his packet transmission (unless due to noise interference other than from other users competing for the medium). Upon detection of a collision within the propagation delay interval, each colliding user aborts his transmission, and subsequently retransmits his message at a time when he determines that the medium is no longer busy. With this configuration, the time wasted during a collision is only the end-to-end propagation delay interval for the medium, in contrast to an interval equal to a single packet length as in the slotted ALOHA system, and an interval greater than a packet length as in the unslotted ALOHA system.

Although relatively efficient compared with contention systems of the unslotted and slotted ALOHA types, the prior art LWT systems incorporating baseband transmission over a two-way medium generally require bi-directional repeaters located with minimum separations along the medium. This requirement is particularly important for relatively large systems where a terminal must perform the collision detection packet comparison operation with his own very high signal-to-noise ratio transmission with the substantially lower signal-to-noise ratio transmission which might come from a distant subscriber. In order to perform this operation, repeaters are provided to digitally regenerate the baseband signals on the medium, including reclocking of the signals to obtain full period bits with satisfactory rise and fall times. In addition, the repeaters must be spaced relatively close together on a multi-drop medium in order to offset delay distortion. These requirements for close repeater spacing are costly in terms of equipment and reliability. Furthermore, the prior art baseband LWT systems are highly susceptible to low frequency noise often found in industrial and computer environments.

It is an object of the present invention to provide an unslotted radio frequency, multiple access bus communications system employing a listen-while-talk contention protocol.

It is a further object to provide a radio frequency, multiple access bus communications system with listen-while-talk contention protocol over a system having unidirectional inbound and outbound signal paths connecting subscriber terminals.

SUMMARY OF THE INVENTION

Briefly, the present invention is directed to an unslotted radio frequency multiple access bus communications system employing a contention listen-while-talk (LWT) protocol. The system includes a plurality of remotely located terminals coupled to a communications bus. The bus includes a pair of oppositely directed, unidirectional signal paths which are connected at one end so that one path is an inbound path to that end and the second is an outbound path from that end. Each of the remote terminals includes a bus interface unit (BIU) coupled to both the inbound and outbound paths at the remote location. By way of example, the communications bus may comprise a pair of coaxial cables and conventional CATV components connected in a two-way cable distribution network.

Each BIU is adapted to transmit and receive modulated carrier signals on the inbound and outbound paths, respectively. The bus interface unit transmits on the inbound cable and receives on the outbound cable. No repeater or other head end equipment is necessary since the system is unslotted and each BIU transmits and receives on the same frequency. In alternative embodiments, frequency conversion may be utilized at the junction of the inbound and outbound paths.

In operation, when a terminal wishes to send a message to another terminal, the terminal's BIU initially performs an rf carrier sensing operation on the outbound path to make an initial determination as to whether or not any other subscriber is transmitting on the inbound path. In the event no carrier is detected, indicating that no other subscriber is using the inbound path, the BIU confirms this initial determination by performing its listen-while-talk function by first transmitting a message addressed to the desired receiving terminal on the inbound path, and then monitoring (i.e. "listening-while-talking") the outbound path for at least the maximum (end-to-end) propagation delay of the entire bus. If the transmitted message is received intact by the transmitting terminal within this period, the transmitting terminal's BIU determines that no collision has taken place between its message and a message sent by another terminal, and that the transmitting terminal has gained access to the bus. Thereafter, the BIU may transmit any remaining portion of its message packet on the inbound path. However, in the event a collision is detected, the transmitting terminal's BIU aborts its transmission and then backs off for a random time period before again attempting to gain access to the bus and transmit its message.

Thus, with this multiple access configuration, all subscribers (i.e. terminals) share the digital channel and have access to all information on the channel and are capable of transmitting all other subscribers on the channel. In addition, no subscriber starts a transmission unless, to the best of the subscriber's knowledge, the channel is not in use. Generally, this determination is made by sensing carrier on the outbound path.

With this configuration, a large number of low duty cycle, or "bursty", subscribers may be accommodated by determining a bandwidth appropriate to match the average aggregate data transmission rate of the entire population, rather than match the sum of the peak rates for bursty subscribers, as in conventional systems. Through the use of message transmission by modulated carrier signal on a unidirectional signal path, the present invention provides a more efficient system than the presently known listen-while-talk protocol systems, since the transmitted data is effected relatively little by signal-to-noise degradation on the line, and no repeaters are required. Furthermore, by utilizing the unidirectional signal paths aspects of the present invention, relatively large bandwidth can be used and thereby increasing the data transfer capability. As a further advantage of the present system, the modulated rf signals are relatively immune to error generation in the data due to interference from external noise sources compared with comparable data signals used in baseband systems.

BRIEF DESCRIPTION OF THE DRAWINGS

The foregoing and other objects of this invention, the various features thereof, as well as the invention itself, may be more fully understood from the following description, when read together with the accompanying drawings in which:

FIGS. 6A–6C show, in block form, the functional operation of the BIU of FIG. 2;

DESCRIPTION OF THE PREFERRED EMBODIMENT

Figure 1:
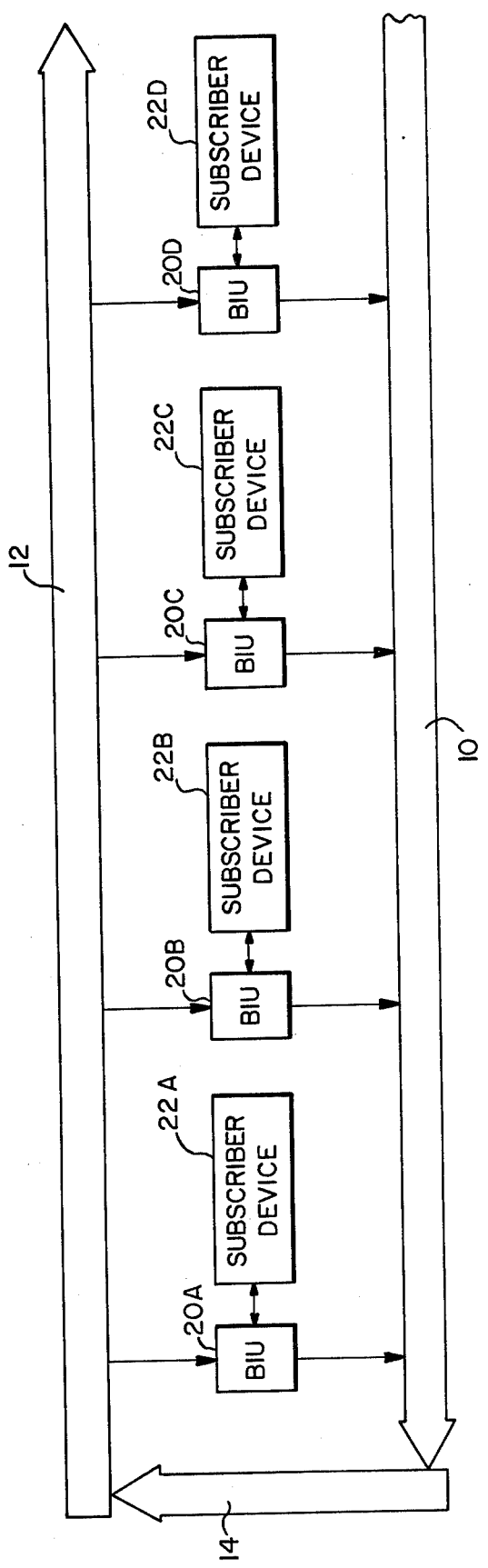
FIG. 1 shows, in block diagram form, an exemplary communications system embodying the present invention.

FIG. 1 shows a communications system 5 embodying the present invention. This embodiment includes a communications bus comprising an inbound unidirectional signal path 10 and an outbound unidirectional signal path 12 and a unidirectional path coupler 14 for transferring signals from the inbound path to the outbound path at the system head-end. The inbound and outbound paths 10 and 12, respectively each pass through a plurality of remote locations at which subscribers may couple to the communications bus. In the present embodiment, signal paths 10, 12 and coupler 14 include a single coaxial cable and associated conventional unidirectional coupling devices (at each subscriber location).

At each subscriber location, a subscriber terminal having a bus interface unit (BIU) and an associated subscriber device may be coupled to paths 10 and 12. Each BIU has an associated subscriber address. In FIG. 1, each BIU is denoted by reference designation 20 and a suffix representative of one of the exemplary locations A,B,C, and D. Similarly, the subscriber devices are denoted by reference designation 22 and a location-keyed suffix. Each BIU 20 receives data from its associated subscriber device 22, formats that data into a standard packet with header information (including originating and destination terminal addresses) and buffers that data packet until transmission time. At that time, the BIU 20 transmits the addressed data packet on the inbound path 10.

In addition, each BIU 20 also scans each packet of data on the outbound path for its own address. If a packet with the address for that BIU is detected, then the BIU reads the complete packet from the outbound path 12 into a buffer, error checks the packet, acknowledges the transmission, and then clocks the data to the subscriber device 22 at a predetermined data rate.

Figure 2:
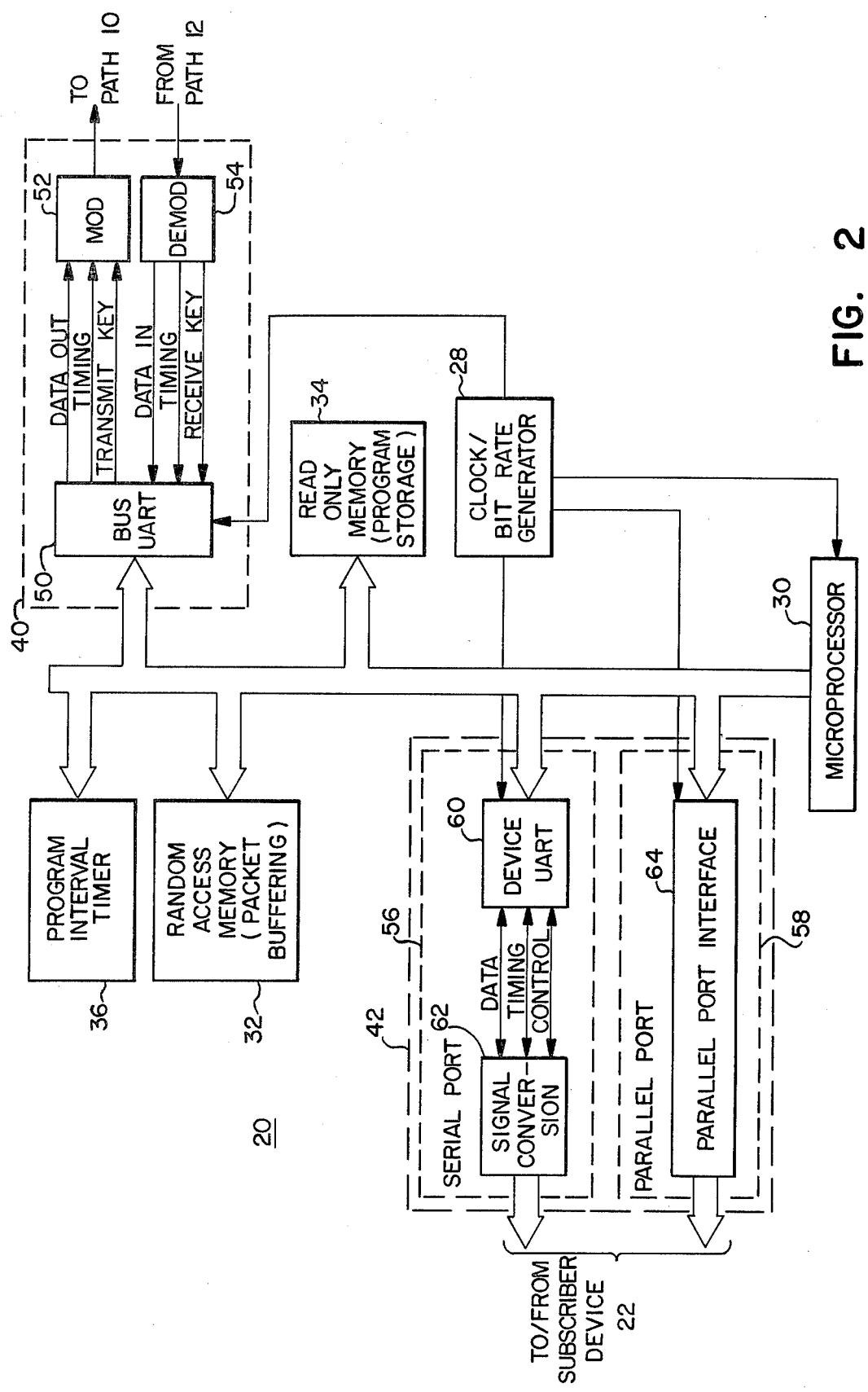
FIG. 2 shows, in block diagram form, the bus interface unit (BIU) of the system of FIG. 1.
Figure 3:
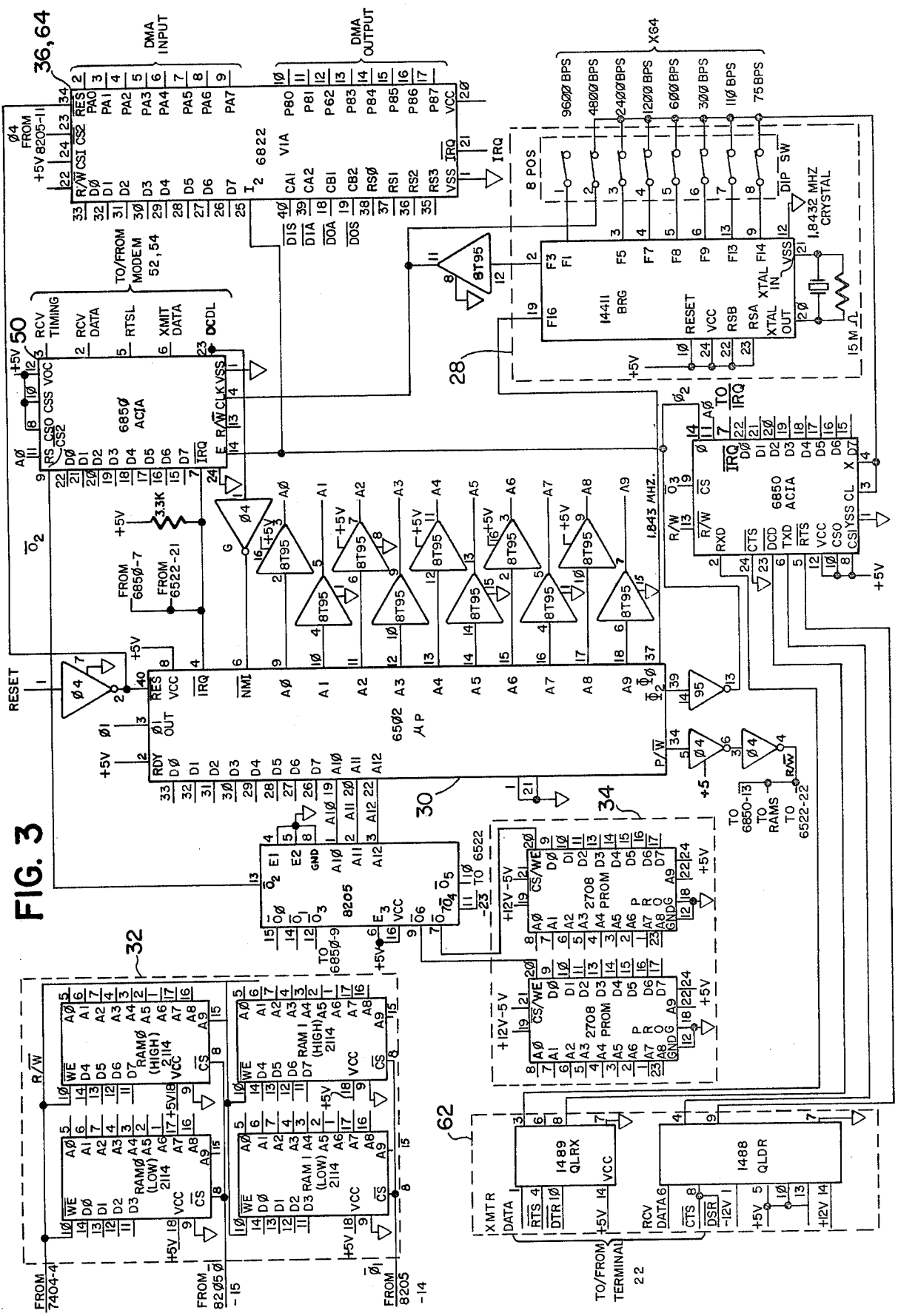
FIG. 3 shows, in schematic form, the bus interface unit (BIU) of the system of FIG. 1.

FIGS. 2 and 3 show a BIU 20 in block diagram form and detailed schematic form, respectively. BIU 20 includes a clock/bit rate generator 28, microprocessor 30, random access memory (RAM) 32, programmable read-only memory (PROM) 34, program interval timer 36, modem interface 40 and subscriber device interface 42. The microprocessor 30 is an MOS Technology type 6502A NMOS microprocessor. In Intel type 8205 decoder is configured to select the various units peripheral to microprocessor 30 based on the state of address line $A_8$-$A_{10}$. RAM 32 is a 2048 byte memory configured from four Intel type 2114 units to provide message buffering, program stack, and temporary storage. PROM 34 is a pair of 1024 byte Intel type 2708 units for providing storage of the BIU program, as shown in the Appendix. The program interval timer 36 is an MOS Technology type 6522 unit. The clock/bit rate generator 28 is a Motorola type 14411 unit, 1.8432 MHz crystal, and switch network arranged to provide a 1.8432 MHz clock signal to microprocessor 30, a 307.2 Kbps clock signal to the modem interface 40, and eight switch selectable clock signals for the device interface 42 (9600 bps, 4800 bps, 2400 bps, 1200 bps, 600 bps, 300 bps, 110 bps, 75 bps).

Figure 4:
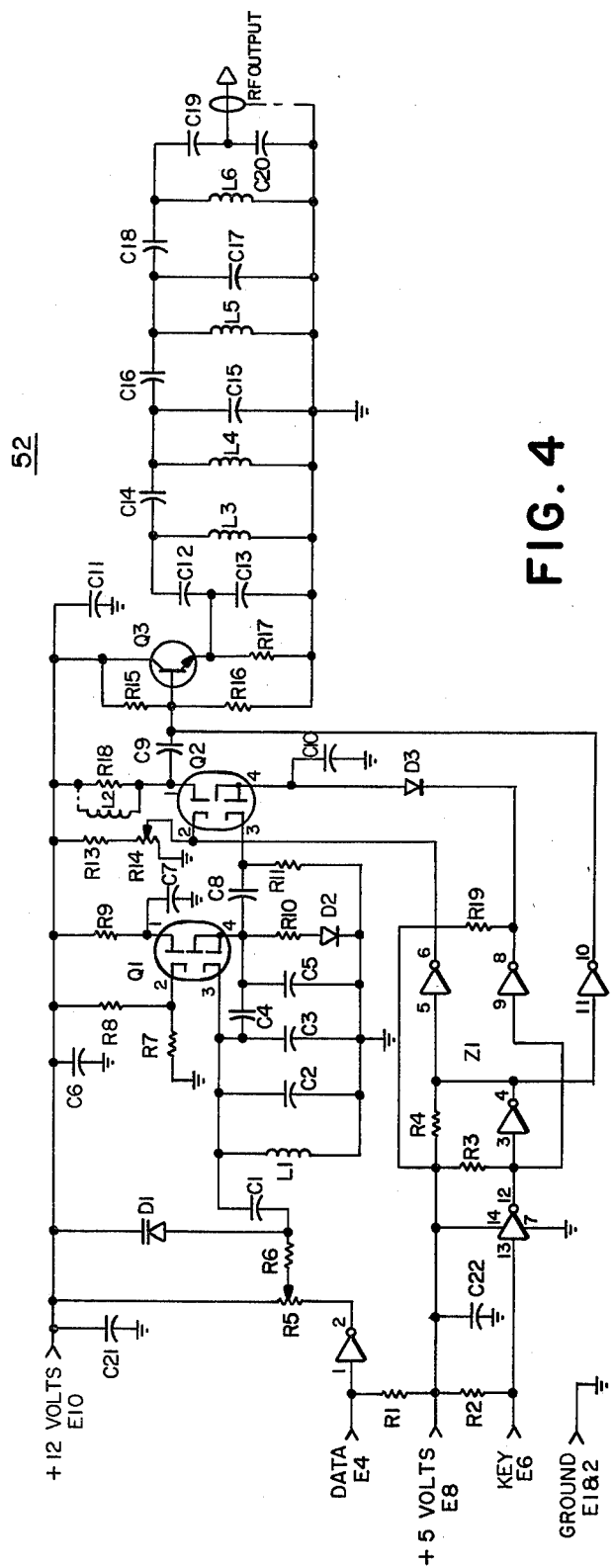
FIG. 4 shows, in schematic form, the modulator of the BIU of FIG. 2.
Figure 5:
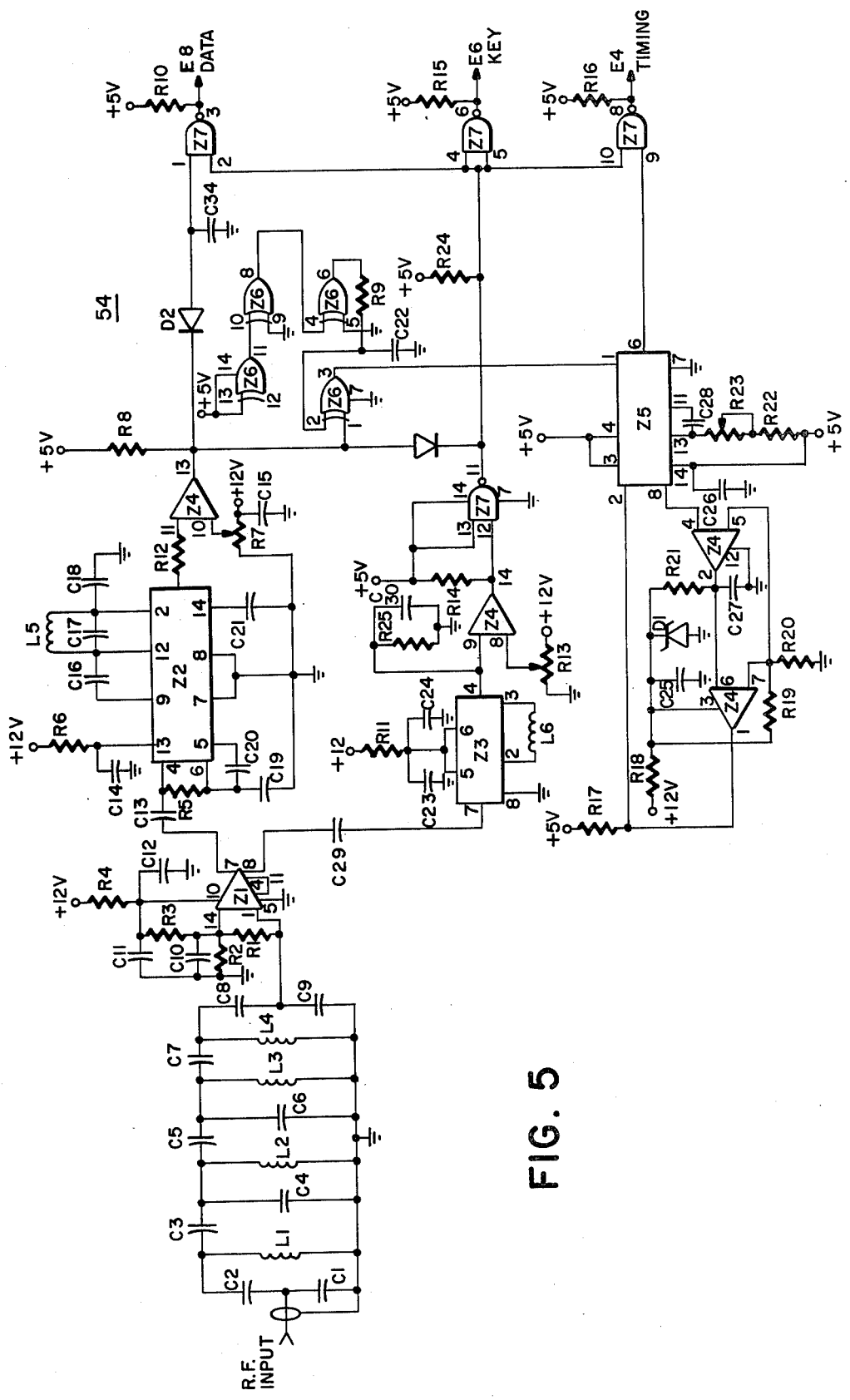
FIG. 5 shows, in schematic form, the demodulator of the BIU of FIG. 2.
Figure 7:
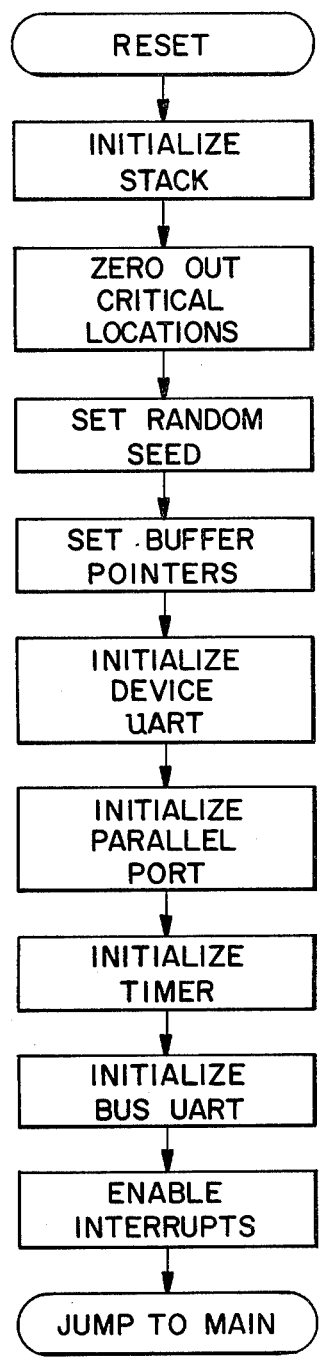
FIGS. 7–14 show, in detailed flow chart form, the functional operation blocks of FIG. 6.
Figure 8:
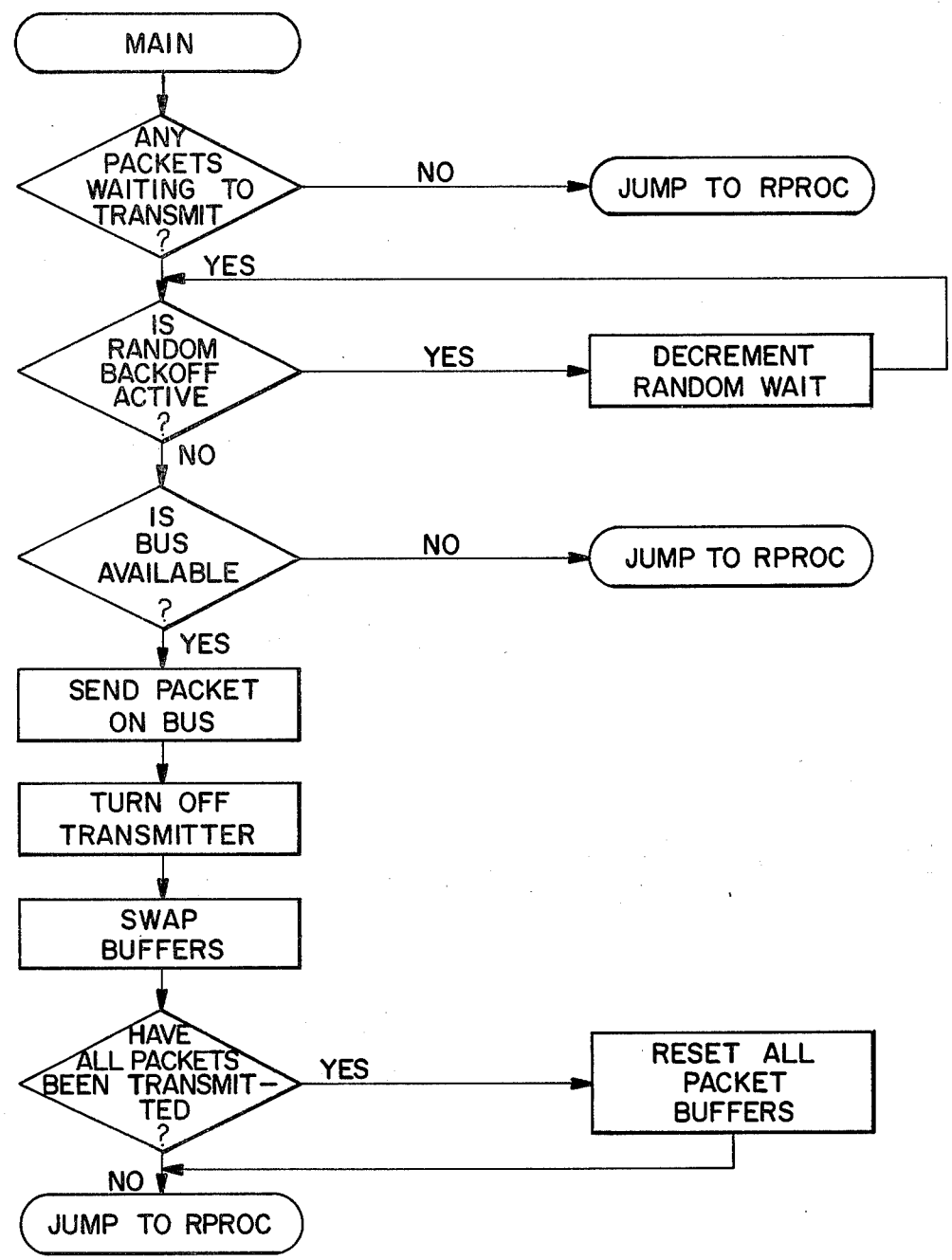
Figure 9:
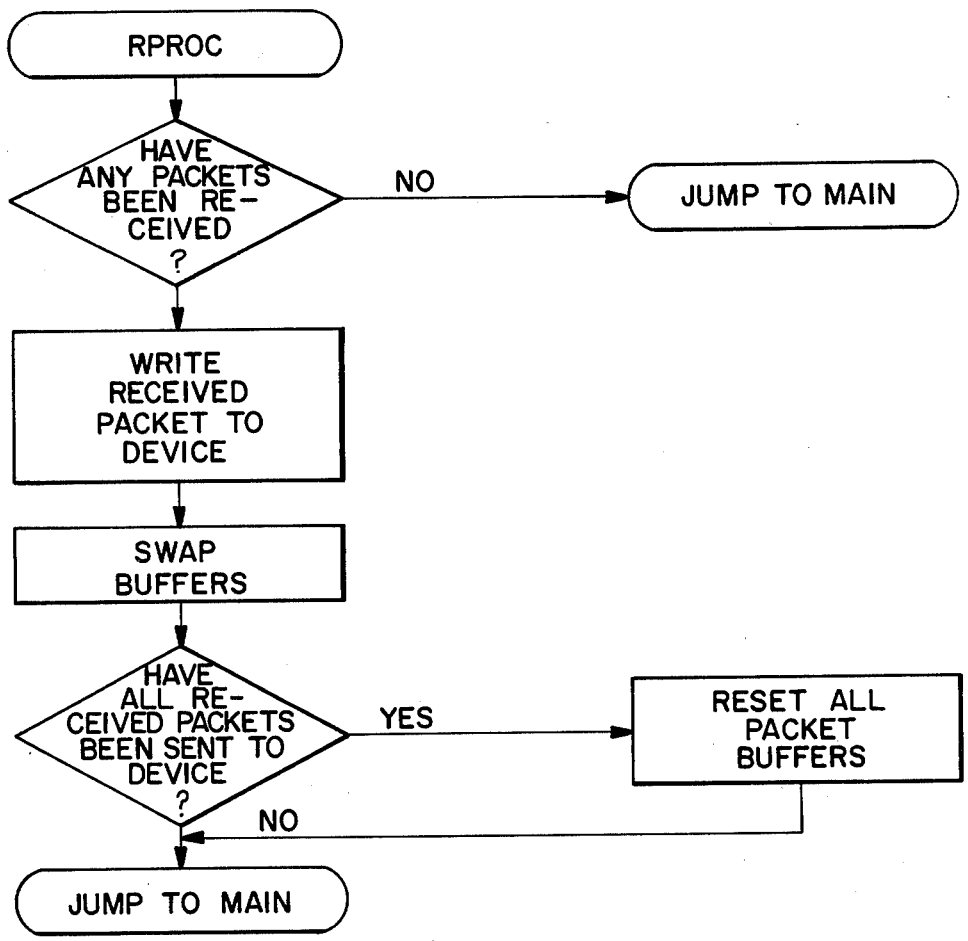
Figure 10:
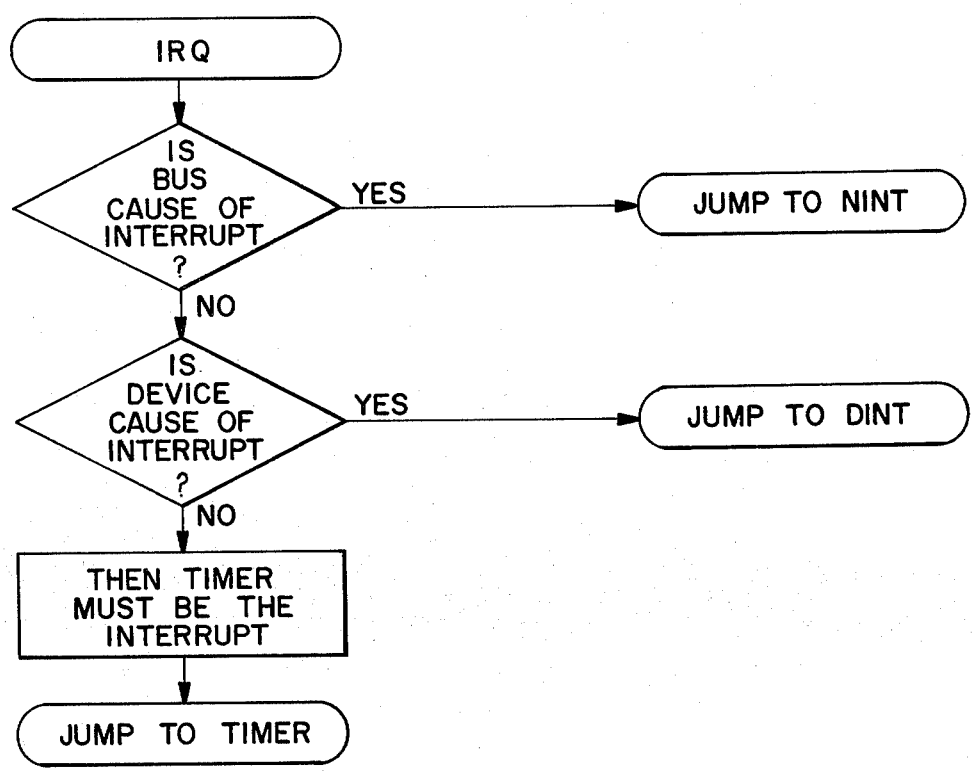
Figure 11:
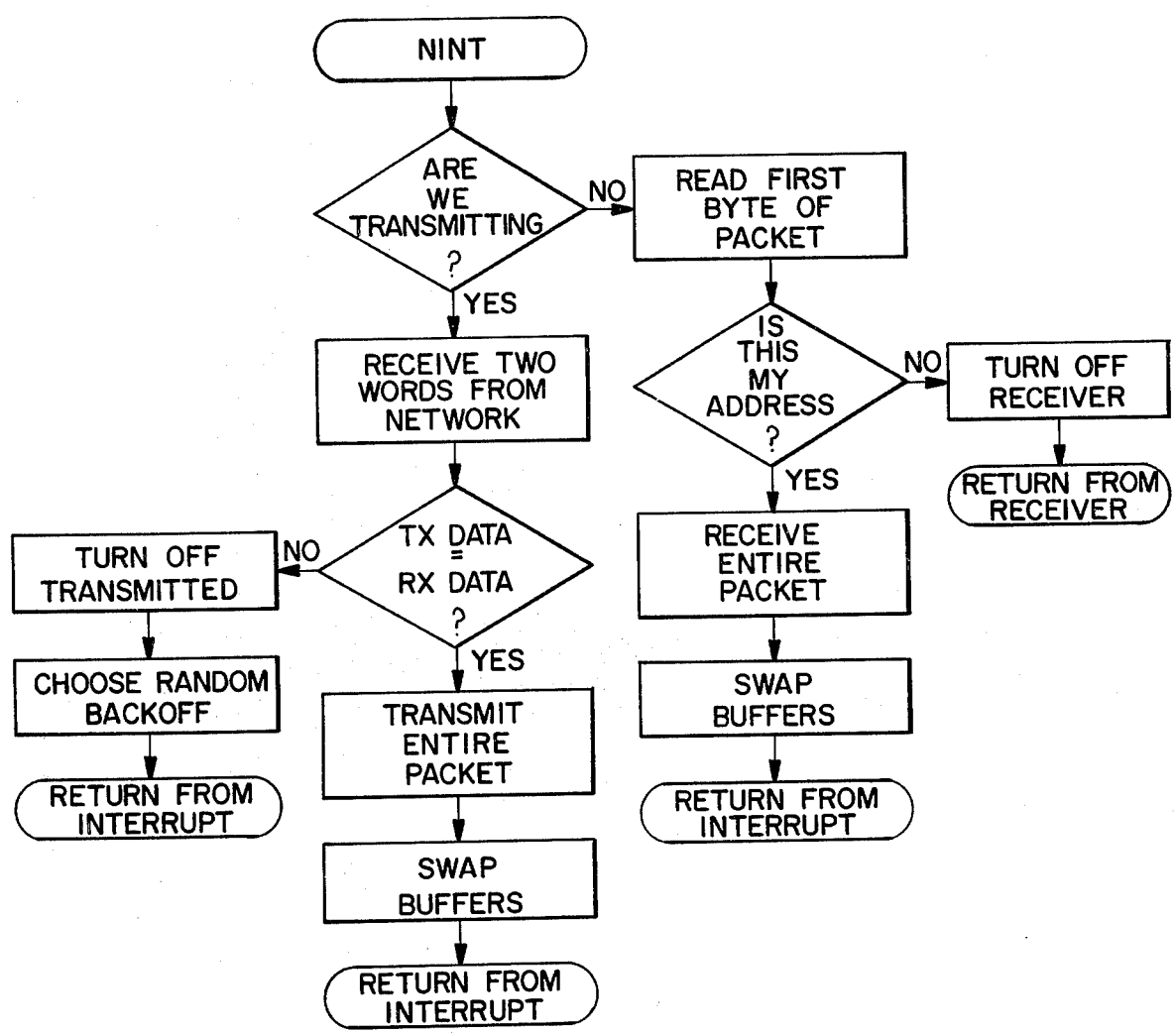
Figure 12:
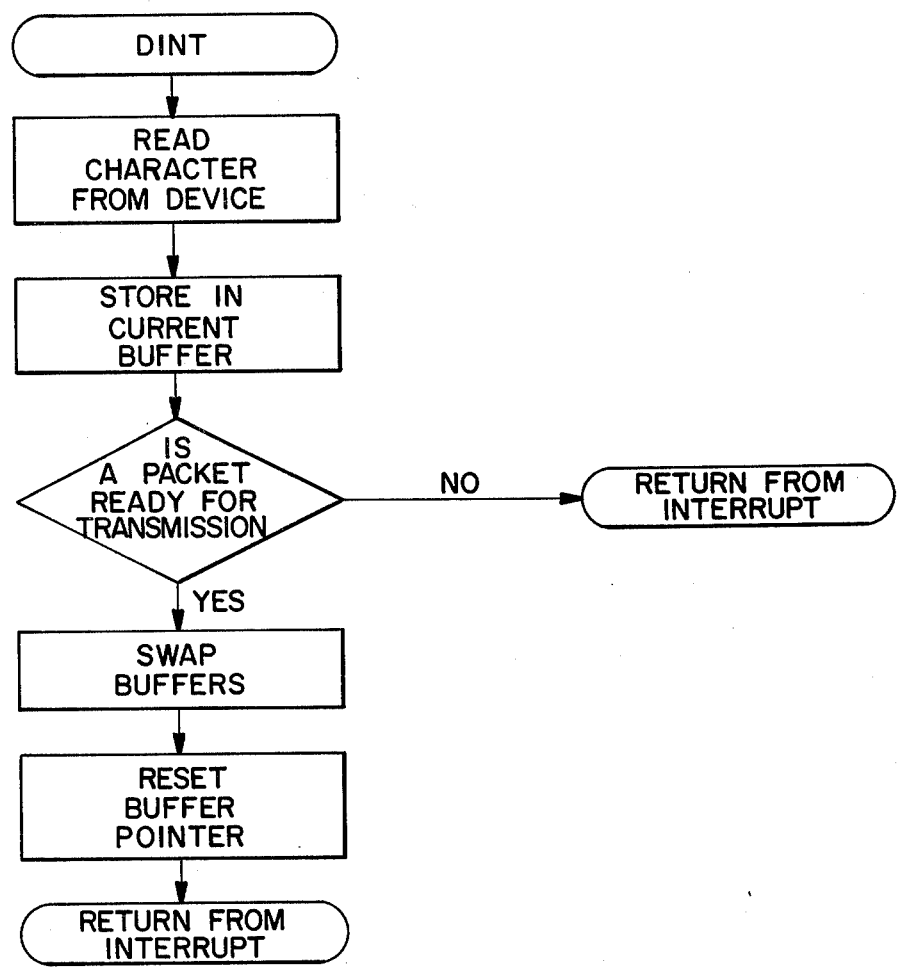
Figure 13:
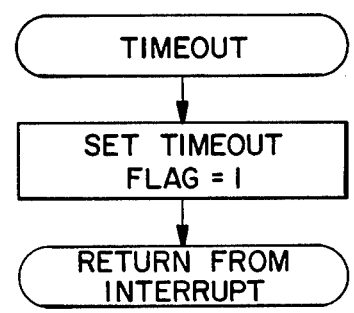
Figure 14:
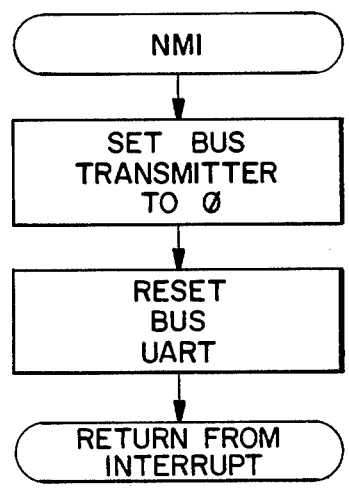

The modem interface 40 includes a bus universal asynchronous receiver transmitter (UART) 50 and rf modulator 52 and demodulator 54. Bus UART 50 is a Motorola type 6850 asynchronous communications interface adapter (ACIA). The modulator 52 and demodulator 54 are shown in detailed schematic form in FIGS. 4 and 5, respectively. Tables I and II show the component values for the circuit elements in modulator 52 and demodulator 54, respectively.

TABLE I

| R1 = 10K | Z1 = 7406 | C1 = 10 pf |
|---|---|---|

TABLE I-continued

| | | |
|---|---|---|
| R2 = 10K | | C2 = 18 pf |
| R3 = 10K | | C3 = 18 pf |
| R4 = 10K | Q1 = 40673 | C4 = 10 pf |
| R5 = 5K, | Q2 = 40673 | C5 = 10 pf |
| R6 = 5.6K | Q3 = 2N3904 | C6 = 1 ufd |
| R7 = 10K | | C7 = 1 ufd |
| R8 = 10K | | C8 = 36 pf |
| R9 = 1.2K | D1 = MV2105 | C9 = 36 pf |
| R10 = 560 | D2 = 1N914 | C10 = 200 pf |
| R11 = 100K | D3 = 1N914 | C11 = 1 ufd |
| R12 = None | | C12 = 82 pf |
| R13 = 820 | | C13 = 370 pf |
| R14 = 1K, | L1 = 5½ T | C14 = 2 pf |
| R15 = 5.1K | L2 = 1 µHy | C15 = 36 pf |
| R16 = 2K | L3 = 4¼ T | C16 = 2 pf |
| R17 = 75 | L4 = 5¼ T | C17 = 36 pf |
| R18 = 1K | L5 = 5¼ T | C18 = 2 pf |
| R19 = 1K | L6 = 4¼ T | C19 = 82 pf |
| | | C20 = 370 pf |
| | | C21 = 1 ufd |
| | | C22 = 1 ufd |

TABLE II

| | | | |
|---|---|---|---|
| R1 = 75 | Z1 = NE592 | C1 = 270 pf | C19 = 1 ufd |
| R2 = 820 | Z2 = LM2111 | C2 = 82 pf | C20 = 1 ufd |
| R3 = 1K | Z3 = MC1330 | C3 = 2 pf | C21 = 62 pf |
| R4 = 100 | Z4 = RC3302 | C4 = 36 pf | C22 = 390 pf |
| R5 = 1K | Z5 = 74122 | C5 = 2 pf | C23 = 1 ufd |
| R6 = 100 | Z6 = 7486 | C6 = 36 pf | C24 = 1500 pf |
| R7 = 5K | Z7 = 7438 | C7 = 2 pf | C25 = 1 ufd |
| R8 = 100 | | C8 = 82 pf | C26 = 1 ufd |
| R9 = 200 | | C9 = 270 pf | C27 = 500 pf |
| R10 = 1K | D1 = IN961 | C10 = 1500 pf | C28 = 680 pf |
| R11 = 100 | D2 = IN914 | C11 = 1 ufd | C29 = 750 pf |
| R12 = 100 | | C12 = 1500 pf | C30 = 1500 pf |
| R13 = 5K | | C13 = 22 pf | C31 = 130 pf |
| R14 = 1K | L1 = 4¼ T | C14 = 1 ufd | C32 = 1 ufd |
| R15 = 1K | L2 = 5¼ T | C15 = 1 ufd | C33 = 1 ufd |
| R16 = 1K | L3 = 5¼ T | C16 = 5 pf | C34 = 1000 pf |
| R17 = 2K | L4 = 4¼ T | C17 = 36 pf | |
| R18 = 100 | L5 = 5¼ T | C18 = 1 ufd | |
| R19 = 2.7K | L6 = 1.5 µHy | | |
| R20 = 560 | | | |
| R21 = 13K | | | |
| R22 = 6.2K | | | |
| R23 = 1K, | | | |
| R24 = 1K | | | |
| R25 = 5.1K | | | |

As shown in FIG. 2, the device interface 42 includes an RS-232C serial data port 56 and an 8 bit full duplex parallel data port 58, although only one of these ports may be selected for operation at a time. In alternative embodiments, both or other conventional device interfaces may be used. The port 56 includes a device UART 60 and signal conversion unit 62, provided by a Motorola type 6850 ACIA unit and associated Signetics type 1488 and 1489 RS-232-C quad driver and quad receiver units, respectively. With this configuration, an Infoton type terminal, for example, may readily be coupled to the BIU. The port 58 includes a parallel port interface 64 which is provided by the type 6522 unit used for the program interval timer 36.

In operation, on power-up or when reset, each BIU 20 asks its associated subscriber device 22 for the destination address (DA) of subsequent transmissions. Where the device 22 is an attended data terminal in the present embodiment, the inquiry is accomplished by printing an inquiry code at the terminal and then waiting for a keyboard entry. BIU 20 transforms the operators response to a 16-bit DA word. The operator may change the entered DA at any time. Where the device 22 is a computer, either a similar dialogue occurs in software or the BIU is programmed to accept and supply completely formatted packets to/from the computer.

All subsequent data from the subscriber device is then buffered in the BIU until an end-of-message, e.g. carriage return, is received or the buffer is filled. The destination address and the BIU's own 16-bit address (OA-originator address) are then appended to the message, together with other header data, to form a packet.

Once a packet has been assembled for transmission, the BIU reads the "receive key" line from the RF demodulator. When the receive key is "off" (i.e. no rf carrier is detected on outbound path 12) no other subscriber is currently transmitting. An "on" condition (i.e. rf carrier is detected) for the receive key indicates that the bus is in use. This is the basic carrier sense mechanism. With the receive key off, the BIU lowers the "transmit key" line and the BIU begins to transmit the message. Multiple transmit buffers for the subscriber device inputs are used so that data may still be accepted from the device while the bus transmission is in progress.

With its receiver enabled, the transmitting BIU sees the receive key go on after the round trip propagation delay of the inbound and outbound paths, and then begins to receive its own transmission. The four bytes (32 bits) are compared against those transmitted and, if identical, the transmitting BIU disables its receiver, and then transmits the remainder of the packet. If the test fails due to noise or another subscriber keying on during the propagation delay window, the BIU disables the transmitter, raises the transmit key signal (the receive key will then go high) and waits a pseudorandom time interval whose mean is approximately 400 microseconds. This random back-up feature is required to eliminate the possibility of two subscribers continually attempting simultaneous retransmissions.

With this configuration, the transmitting BIU listens for only 4 bytes (32 bits), i.e. the destination address and originator address. The four byte collision window (i.e. listening period) is longer than the maximum end-to-end propagation delay of the bus, which defines the limits of the time window in which other subscribers can possibly start transmissions without hearing, and therefore, deferring from transmitting their packets. This is the basic feature of the "listen-while-talk" protocol. Detection of collisions is insured since the first two characters of each message are the destination address and originator's address. This is a unique combination for each transmitting BIU.

In alternative configurations, different length collision windows may be utilized depending on the system geometry. The collision window must commence at least $t_1$ from the packet start transmit time and extend at least $t_2$ from that transmit time, where $t_1$ equals the signal propagation time from the location of the transmitting BIU along the inbound path, the head end coupler, and along the outbound path back to the transmitting BIU, and where $t_2$ equals $t_1$ plus the signal propagation time along the inbound path between the transmitting BIU and the BIU located furthest from the head end along that path.

Computer subscribers to the bus insert the destination address into each packet transmitted since in the present embodiment no dialogue with the computer itself is conducted to establish addresses. Computer subscribers also supply the byte count of the packet. The BIU then accepts the proper number of bytes from the computer and then the packet is transmitted.

Packet reception from the outbound path which originate from other subscribers occurs in the following manner. At power-up the receiver of each BIU is enabled. The BIU compares the first 16 bits of each received packet with its own address. If the address comparison is successful, (i.e. detects a match), subsequent characters from the network are buffered until the received byte count is satisfied or the receive buffer is full. If the comparison fails the BIU disables its receiver. During any bus transmission, the receive key signal is on. When the receive key returns to the off condition, i.e., the previous packet transmission is complete, the BIU re-enables the receiver and awaits reception of the next packet.

Other receive filtering criteria are possible. Most systems require special message types (status, assignment) or filtering on originator's address as opposed to or in addition to the destination address in the packet. These features are readily programmed within the BIU.

Once a complete packet has been received, the BIU clocks the data to the subscriber at the subscriber data rate. Again, multiple buffering of received packets is employed so that subsequent packets may be received from the network while the first is being clocked to the subscriber.

For data received from the outbound path 12, the bus UART 50 performs serial-to-parallel conversion of data from the demodulator 52, checks each character for the proper number of start/stop bits, and generates an interrupt to the microprocessor 30 for each character received when the bus UART 50's receiver is enabled. Since the bus UART 50 is a full duplex device, data transmission can occur simultaneously. For data to be transmitted on inbound path 10, the microprocessor 30 first strobes each data word onto the bus UART 50 data bus lines. Then the bus UART 50 inserts start/stop bits, parity bits, performs the parallel-to-serial conversion, and clocks the data to the modulator at the supplied transmit clock rate. Since the bus UART 50 is double buffered on receive and transmit, a second character can be received while the first is being read by the microprocessor 30 or a second character can be loaded for transmission by the microprocessor 30 while the first is being clocked out to the modulator 52.

The bus UART 50 also provides a status register which can be read by the microprocessor 30 to indicate:

(1) the receiving holding register is full (this also causes an interrupt);

(2) the transmitter holding register is empty;

(3) the status of the "receive key" signal (logic "1" indicates the network is available, logic "0" indicates the network is busy);

(4) a false start bit was detected;

(5) the receiver holding has been overrun by a second character since the first was not read by a peripheral device;

(6) a parity error was detected;

(7) an interrupt was generated.

The device UART 60 used to interface the subscriber device 22 functions in conjunction with microprocessor 30 in a manner similar to UART 50. Serial data input by the device 22 is received by RS-232-C signal conversion hardware and then input to the device UART 60.

In the present configuration, each BIU performs the following functions in support of the basic packet transfer mechanism of "listen-while-talk":

(1) Initialize the microprocessor and its peripheral units at power-on and when the BIU is reset;

(2) move packets from the buffer memory 32 to the bus UART 50;

(3) check each packet transmitted to insure that collisions have not occurred. If a collision occurs, randomly back-off and then automatically retransmit the packet;

(4) receive properly addressed packets from the inbound path 10 and deposit them in memory 32.

In general, the device software is specific to the particular subscriber device 22 being interfaced to a location along the bus. However, each BIU 20 performs the following functions to support its associated subscriber device:

(1) Move received packets from the memory 32 to the connected device 22;

(2) accept data from the connected device 22 and format complete subscriber messages into the network packet;

(3) support a dialogue with terminal subscribers to establish destination address of subsequent data.

In addition, the present embodiment performs packet error checking and acknowledgements, retransmission of packets not acknowledged, and generation of status messages.

The above functions are depicted generally in the function block diagrams of FIGS. 6A-C, and in detail in the flow-charts of FIGS. 7-14, where each of FIGS. 7-14 corresponds to one of the blocks of FIGS. 6A-C.

The present embodiment provides an error correcting, packet communications protocol which includes the parts described in the following sections:

(1) Packet Transfer—This part of the protocol provides the listen-while-talk (LWT) mechanism for sharing the digital channel among a large number of subscribers.

(2) Error Correction—This part of the protocol provides end-to-end (transmitting BIU to receiving BIU) error detection and automatic retransmission of packets in error. An 8-bit check-sum is used for error detection.

(3) Flow Control—Receiving subscribers to the bus may control the rate at which buffers are transmitted in point-to-point conversations. Through the use of large buffers in the BIU's and this flow control mechanism, receiver overrun is avoided.

(4) Status—The BIU 20 automatically provides unsolicited status messages at approximately one minute intervals. Status messages contain the results of BIU self tests (e.g. memory and peripheral status register checks) and the current state of the connected device 22.

(5) Networking Addressing—Each subscriber device 22 may establish and change destination addresses.

Packet Transfer

The LWT protocol requires each subscriber to hear his own packet transmissions as well as those of all other subscribers. When a BIU is ready to transmit, the BIU first checks the outbound channel to see if it is busy. If busy, the BIU simply waits until the line is free. When free, the first words of the packet are transmitted on the inbound channel and the BIU begins to see its own transmission on the outbound channel but delayed by the propagation time. The BIU then checks to see if the transmitted data is identical to that being received. If so, the BIU transmits the remainder of the packet knowing that all other subscribers are now waiting. If an error (either caused by noise or another subscriber's transmission), is detected, the BIU determines that a "collision" exists. In response to this determination, the BIU stops transmitting, freeing the channel for other subscribers, and then backs off a random amount of time before retransmitting. Thus, the transmitting subscriber listens to his own transmission for at least the maximum proagation delay of the cable system, since this is the time window in which another subscriber could start before hearing the original transmission.

In the present embodiment, the choice of the random back-off time uses a random number generator in the BIU with a fixed means of about 400 microseconds. In heavily loaded systems, collisions between packets and subsequent random retransmissions of the packet occur frequently. In other words, as the system becomes busier, the probability that two subscribers start a packet transmission within the end-to-end propagation delay window increases.

Figure 15:
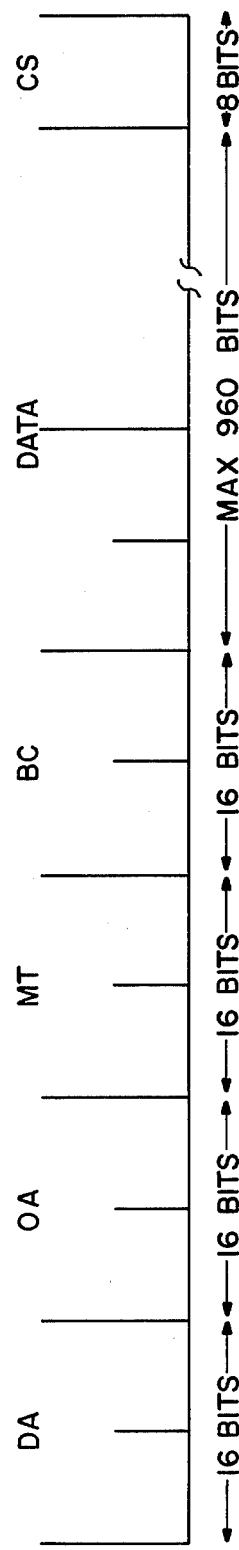
FIG. 15 shows the packet format for the system of FIG. 1.

FIG. 15 shows the basic packet format for the LWT bus. Four 16 bits form the header portion, with the words being representative of the destination address (DA), originator address (OA), message type (MT), and byte (8 bits) count (BC). The header portion is followed by as many as 960 bits of message data and an 8 bit check-sum word used for error control.

In addition to receiving its own transmission, each BIU examines the outbound channel for address matches or special message types. Subject to processing time limitations within the BIU, this message type and address filtering may readily be varied.

Error Correction

Although the LWT packet transfer protocol provides some error detection on the front end of each packet and subsequent retransmission, an error correcting end-to-end technique is used in addition. More particularly, an acknowledgement for each packet transmitted without error. Automatic retransmission is provided for each packet not acknowledged. To provide this error correction, each packet includes a sequence bit (1 or 0) and an 8 bit check-sum (CS). When the packet is received at the destination address, the check-sum is compared with received packet. If the check-sum is correct for the received packet, the receiver transmits an ACK message to the originating terminal containing the same sequence bit as that received. Thus, a transmitter whose packet is not acknowledged must retransmit the original packet after waiting a fixed time interval. A receiver who acknowledges a packet but subsequently receives a packet with the same sequence bit must assume that the ACK packet was lost and must retransmit the ACK. If eight retries are unsuccessful, the transmitter deletes the packet from the transmit queue, and increments a "failed packet transmission" count. Each retry also causes a "retry" count to be incremented.

Flow Control

Receivers may control the flow of data transmitted to them by selectively failing to acknowledge packets. The data flow is effectively controlled since the transmitter must retransmit the same packet. This aspect of the present invention is particularly useful in aiding transmissions from a computer subscriber device to an I/O terminal subscriber device. In this case, the large buffers contained in the terminal BIU can free the computer from a relatively slow I/O terminal.

Status

The programmable communications interface provides an opportunity to perform BIU 20 self-tests and report this information to a central status monitor and/or the connected subscriber device 22. To this end, the BIU performs self-tests in the background when it is not involved in the transmission or reception of data from either the network or the connected device. Specifically, the following tests are performed and results thereof maintained in memory:

(1) The BIU performs a complete memory test of all random access memory (RAM) 32 locations.

(2) The BIU examines the status registers contained in the parallel port 58, serial port 56, and interval timer 36. The comparison is performed to determine differences between the expected values and the actual values of each register.

In addition, the following status data is maintained between status messages:

(1) A count of the number of unacknowledged packets.

(2) A count of the number of packets that were discarded because eight retransmissions were attempted but not acknowledged.

The results of each of these tests, the status data, the current value of the device status register in either parallel port 58 or serial port 56, the number of packets queued for transmission, and the number of queued received packets are reported in each transmitted status message. Each BIU provides an unsolicited status message approximately every minute based on interval timer 36 within the BIU.

The status message is a unique message type on the LWT bus, and is characterized by an associated code word in the message type (MT) portion of the packet format.

Network Addressing

The BIU permits its connected subscriber to quickly change the destination address of packets it wishes to transmit. Computer subscribers may be in conversation with a number of other network subscribers. Thus, successive packets may contain a variety of destination addresses. Therefore, computer subscribers must completely format each packet before sending it to the BIU. The BIU simply accepts this formatted packet and faithfully transmits it onto the network.

For attended terminal devices, power-on reset or the manual reset switch causes the BIU 20 to explicitly inquire as to the desired receiver. Valid responses are converted into destination addresses, and the BIU transmits a sign-on request message to the specified destination address. If no response is received within approximately fifteen seconds, a "SYSTEM NOT AVAILABLE" message is transferred to the device 22. If a response is received, the BIU 20 assumes a proper connection and a "LINK ACCEPTED" message is transferred to device 22.

For unattended devices, i.e. printers, cassette recorders, discs, etc., sign-on requests are immediately accepted if the device is not currently logically connected to another subscriber. Otherwise, a response to the sign-on request is not transmitted, and a "SYSTEM NOT AVAILABLE" message is transferred to the device that originated the sign-on request.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

```
CARD #  LOC    CODE       CARD    10        20        30        40        50        60        70
   2    0000                   .OPT NOCNT,XREF,HEH,LIST,ERR,GEN                                 0000000
   3    0000               ;                                                                    0000000
   4    0000               ; THIS IS THE HRAMC BIU TERMINAL CODE AS OF 03/18/78                 0000000
   5    0000               ;                                                                    0000000
   6    0000               ; MESSAGE TYPE EQUATES ARE BELOW                                     0000000
   7    0000               ;                                                                    0000000
   8    0000               DATMSG   = 0           DATA MESSAGES ARE 00-1F                       0000000
   9    0000               STAMSG   = $DB         STATUS MESSAGE                                0000000
  10    0000               SOFMSG   = $DE         SIGN-OFF MESSAGE                              0000000
  11    0000               SACMSG   = $DF         SIGN-ON ACKNOWLEDGMENT                        0000000
  12    0000               SONMSG   = $E0         SIGN-ON MSG (E0-FF)                           0000000
  13    0000               TTY      = 2           DATA TYPE FOR TTY-COMPATIBLE TERMINALS        0000000
  14    0000               ;                                                                    0000000
  15    0000               ; DEVICE ADDRESSES FOLLOW                                            0000000
  16    0000               ;                                                                    0000000
  17    0000               NUARTS   = $300        NETWORK UART STATUS                           0000000
  18    0000               NUARTD   = $801        NETWORK UART DATA                             0000000
  19    0000               DUARTS   = $C00        DEVICE UART STATUS                            0000000
  20    0000               DUARTD   = $C01        DEVICE UART DATA                              0000000
  21    0000               TIMR1L   = $1004       TIMER #1 LOW BYTE                             0000000
  22    0000               TIMR1H   = $1005       TIMER #1 HIGH BYTE                            0000000
  23    0000               PACR     = $100B       PARALLEL PORT AUXILARY CONTROL REGISTER       0000000
  24    0000               PIFR     = $100D       PARALLEL PORT INTERRUPT FLAG REGISTER         0000000
  25    0000               PIER     = $100E       PARALLEL PORT INTERRUPT ENABLE REGISTER       0000000
  26    0000               ;                                                                    0000000
  27    0000               ; THE FOLLOWING EQUATES ARE FOR OFFSETS INTO THE THREE               0000000
  28    0000               ; TABLES: BUFL, BUFH AND PACNUM. THERE ARE THREE TYPES OF            0000000
  29    0000               ; BUFFERS: TRANSMIT (TO THE NETWORK), RECEIVE (FROM THE              0000000
  30    0000               ; NETWORK) AND BIU-CREATED (FOR STATUS MESSAGES).                    0000000
  31    0000               ;                                                                    0000000
  32    0000               XNET     = 0           FROM XMIT BUFFERS TO NETWORK                  0000000
  33    0000               XDEV     = 1           TO XMIT BUFFERS FROM DEVICE                   0000000
  34    0000               PDEV     = 2           FROM RECEIVE BUFFERS TO DEVICE                0000000
  35    0000               RNET     = 3           TO RECEIVE BUFFERS FROM NETWORK               0000000
  36    0000               BIUXMT   = 4           FROM BIU-CREATED BUFFERS TO NETWORK           0000000
  37    0000               BIUCRE   = 5           TO BIU-CREATED BUFFERS FROM BIU               0000000
```

```
CARD # LOC    CODE       CARD    10        20         30         40         50         60         70
  39  0000                  ;                                                                           0000000
  40  0000                  ; THE FOLLOWING VARIABLES ARE CLEARED WHENEVER RESET IS HIT.                0000000
  41  0000                  ; THEY INCLUDE THREE TABLES:                                                0000000
  42  0000                  ; BUFL - THE LOW HALVES OF THE SIX ADDRESSES LISTED ABOVE                   0000000
  43  0000                  ; BUFH - THE HIGH HALVES OF THE SIX ADDRESSES LISTED ABOVE                  0000000
  44  0000                  ; PACNUM - THE NUMBER OF USED BUFFERS IN EACH CATEGORY                      0000000
  45  0000                  ;                                                                           0000000
  46  0000                          *=0                                                                 0000000
  47  0000          BUFL    *=*+6           6 LOW BYTES OF BUFFER ADDRESSES                             0000000
  48  0006          BUFH    *=*+6           6 HIGH BYTES OF BUFFER ADDRESSES                            0000000
  49  000C          PACNUM  *=*+6           6 # OF USED PACKETS                                         0000000
  50  0012  00 00   TEMPTR  .DBYTE 0        TEMPORARY PTR USED BY NET AND DEV                           0000000
  51  0014  00      TEMPBC  .BYTE  0        BYTE COUNT USED BY NET AND DEV                              0000000
  52  0015  00 00   INTPTR  .DBYTE 0        TEMPORARY PTR USED BY NINT AND DINT                         0000000
  53  0017  00      NINTBC  .BYTE  0        BYTE COUNT USED BY NINT                                     0000000
  54  0018  00      DINTBC  .BYTE  0        CURRENT BYTE COUNT OF MSG BEING TYPED IN                    0000000
  55  0019  00 00   BIUPTR  .DBYTE 0        PTR TO BIU-CREATED BUFFER                                   0000000
  56  001B  00      RANDU   .BYTE  0        CURRENT RANDOM NUMBER                                       0000000
  57  001C  00      XMIT    .BYTE  0        TRANSMIT FLAG                                               0000000
  58  001D  00      RNDCNT  .BYTE  0        CURRENT RANDOM COUNT                                        0000000
  59  001E  00 00   TOKEN   .DBYTE 0        TEMPORARY RECEIVED DATA BUFFER                              0000000
  60  0020  00      WAIT    .BYTE  0        WAITING FOR SIGN ON ACK FLAG                                0000000
  61  0021  00      CURTAB  .BYTE  0        THE CURRENT TABLE ENTRY                                     0000000
  62  0022  00      NUMXMT  .BYTE  0        # OF XMITTED MSGS SINCE LAST STATUS MSG                     0000000
  63  0023  00      NUMCOL  .BYTE  0        # OF COLLISIONS SINCE LAST STATUS MSG                       0000000
  64  0024          TOD     *=*+3           THE CURRENT TIME OF DAY IN 1/4-SECONDS                      0000000
  65  0027          TSTAT   *=*+3           TIME TO XMIT THE NEXT STATUS MSG                            0000000
  66  002A  00      TSACK   .BYTE  0        TIMEOUT ON WAITING FOR SIGN-ON ACK                          0000000
  67  002B  00 00   TEMP    .DBYTE 0        SCRATCH LOCATION                                            0000000
  68  002D  00      XSAVE   .BYTE  0        USED TO SAVE X                                              0000000
  69  002E          STRING  *=*+5           INPUT STORAGE FOR "WHICH SYSTEM" RESPONSE                   0000000
  70  0033                  ;                                                                           0000000
  71  0033                  ; THE FOLLOWING VARIABLES ARE NOT CLEARED WHEN RESET IS HIT                 0000000
  72  0033                  ;                                                                           0000000
  73  0033                          *=$0040                                                             0000000
  74  0040  00      CONECT  .BYTE  0        CONNECTION FLAG                                             0000000
  75  0041  00      XADDR   .BYTE  0        THE CURRENT XMIT ADDRESS                                    0000000
  76  0042  00      NUMDAT  .BYTE  0        THE NUMBER OF XMIT BUFFERS DEFINED                          0000000
  77  0043  00      TCOUNT  .BYTE  0        COUNTS TIMER INTERRUPTS                                     0000000
  78  0044          MAXPAX  *=*+3           TABLE OF MAX BYTE COUNT FOR EACH BUFFER TYPE                0000000
  80  0047                  ;                                                                           0000000
  81  0047                  ; THE CODE FOLLOWS. EXECUTION COMES HERE WHEN RESET IS HIT.                 0000000
  82  0047                  ;                                                                           0000000
  83  0047                          *=$F800                                                             0000000
  84  F800  D8      RESET   CLD             DON'T WANT DECIMAL MODE                                     0000000
  85  F801  A2 FF           LDX #$FF        INITIALIZE THE STACK POINTER                                0000000
  86  F803  9A              TXS                                                                         0000000
  87  F804                  ;                                                                           0000000
  88  F804  A2 57           LDX #%01010111  RESET DEVICE UART                                           0000000
  89  F806  8E 00 0C        STX DUARTS                                                                  0000000
  90  F809  A2 96           LDX #%10010110  INITIALIZE DEVICE UART                                      0000000
  91  F80B  8E 00 0C        STX DUARTS                                                                  0000000
  92  F80E  A2 57           LDX #%01010111  RESET NETWORK UART                                          0000000
  93  F810  8E 00 08        STX NUARTS                                                                  0000000
  94  F813  A2 D4           LDX #%11010100  INITIALIZE NETWORK UART                                     0000000
  95  F815  8E 00 08        STX NUARTS                                                                  0000000
  96  F818  A2 40           LDX #%01000000  TIMER1 IS FREE RUNNING                                      0000000
  97  F81A  8E 0B 10        STX PACR                                                                    0000000
  98  F81D  A2 C0           LDX #%11000000  ENABLE INTERRUPTS FROM TIMER1                               0000000
  99  F81F  8E 0E 10        STX PIER                                                                    0000000
 100  F822  A2 00           LDX #00         SET TIMER1 TO $E100 (1/32 SECOND)                           0000000
 101  F824  8E 04 10        STX TIMR1L                                                                  0000000
 102  F827  A2 E1           LDX #$E1                                                                    0000000
 103  F829                  STX TIMR1H      THIS STARTS THE COUNTING                                    0000000
 104  F829  EA              NOP             THIS TEMPORARILY STOPS THE TIMER                            0000000
 105  F82A  EA              NOP                                                                         0000000
 106  F82B  EA              NOP                                                                         0000000
 107  F82C  A2 08           LDX #8          WANT TO COUNT 8 TIMEOUTS (1/4 SECOND)                       0000000
 108  F82E  86 43           STX TCOUNT                                                                  0000000
 109  F830                  ;                                                                           0000000
 110  F830  A2 FF   RESTRT  LDX #$FF        RESET THE STACK PTR                                         0000000
 111  F832  9A              TXS                                                                         0000000
 112  F833  A2 3F           LDX #$3F        ZERO OUT FIRST 3F LOCATIONS                                 0000000
 113  F835  A9 00           LDA #0                                                                      0000000
 114  F837  95 00   R0      STA 0,X                                                                     0000000
 115  F839  CA              DEX                                                                         0000000
 116  F83A  10 FB           BPL R0                                                                      0000000
 117  F83C  A9 08           LDA #08                                                                     0000000
 118  F83E  85 18           STA DINTBC      PACKET FROM DEVICE IS EMPTY                                 0000000
 119  F840                  ;                                                                           0000000
 120  F840  A9 02           LDA #02         WANT TO INITIALIZE THE BUFFER PTRS                          0000000
 121  F842  85 2B           STA TEMP        LOOP COUNTER                                                0000000
 122  F844  A5 2B   ILOOP   LDA TEMP        GET THE COUNTER                                             0000000
 123  F846  0A              ASL A           WANT 0, 2, OR 4 (EACH PTR PAIR)                             0000000
 124  F847  AA              TAX             PARAMETER TO PINIT IS IN X                                  0000000
 125  F848  20 55 FD        JSR PINIT       INITIALIZE THE PTR PAIR                                     0000000
 126  F84B  C6 2B           DEC TEMP        THE LOOP COUNTER                                            0000000
 127  F84D  10 F5           BPL ILOOP                                                                   0000000
 128  F84F  AD D2 FD        LDA BCRBUF      INITIALIZE MAXPAX WITH THE BYTE ...                         0000000
```

| CARD # | LOC | CODE | CARD | 10 | 20 | 30 | 40 | 50 | 60 | 70 |
|---|---|---|---|---|---|---|---|---|---|---|
| 129 | F852 | 85 45 | | STA MAXPAX+1 | COUNTS OF THE RECEIVE BUFFERS ... | | | | | 0000000 |
| 130 | F854 | AD D3 FD | | LDA BCBBUF | AND THE BIU-CREATED BUFFERS | | | | | 0000000 |
| 131 | F857 | 85 46 | | STA MAXPAX+2 | | | | | | 0000000 |
| 132 | F859 | AD F9 FF | | LDA HOME | | | | | | 0000000 |
| 133 | F85C | 85 1B | | STA RANDU | STORE HOME ADDRESS IN RANDOM SEED | | | | | 0000000 |
| 134 | F85E | A9 F0 | | LDA #240 | XMIT FIRST STATUS MSG A MINUTE FROM CONNECTION | | | | | 0000000 |
| 135 | F860 | 85 27 | | STA TSTAT | | | | | | 0000000 |
| 136 | F862 | | ; | | | | | | | 0000000 |
| 137 | F862 | A5 40 | | LDA CONECT | GET OLD CONECT FLAG | | | | | 0000000 |
| 138 | F864 | A2 00 | | LDX #00 | AND SET CONECT TO 0 (UNCONNECTED) | | | | | 0000000 |
| 139 | F866 | 86 40 | | STX CONECT | | | | | | 0000000 |
| 140 | F868 | C9 01 | | CMP #01 | WERE WE PREVIOUSLY CONNECTED? | | | | | 0000000 |
| 141 | F86A | D0 18 | | BNE R1 | IF NOT CONNECTED, GO TO R1 | | | | | 0000000 |
| 142 | F86C | A2 DE | | LDX #SOFMSG | SIGN OFF MESSAGE TYPE | | | | | 0000000 |
| 143 | F86E | 20 76 FD | | JSR BCONST | CONSTRUCT THE PACKET | | | | | 0000000 |
| 144 | F871 | A2 05 | | LDX #BIUCRE | | | | | | 0000000 |
| 145 | F873 | 20 64 FD | | JSR BUMP | BUMP PTRS FOR BIU-CREATED BUFFERS | | | | | 0000000 |
| 146 | F876 | A0 7A | | LDY #LINKT | PRINT "LINK TERMINATED" | | | | | 0000000 |
| 147 | F878 | 20 A8 FD | | JSR PUTSTR | | | | | | 0000000 |
| 148 | F87B | 58 | | CLI | ALLOW INTERRUPTS | | | | | 0000000 |
| 149 | F87C | 20 56 F9 | DISOUT | JSR NET | OUTPUT THE DISCONNECT MESSAGE | | | | | 0000000 |
| 150 | F87F | A5 11 | | LDA PACNUM+BIUCRE | WAS THE MESSAGE SENT? | | | | | 0000000 |
| 151 | F881 | D0 F9 | | BNE DISOUT | LOOP UNTIL IT IS | | | | | 0000000 |
| 152 | F883 | 78 | | SEI | DISABLE INTERRUPTS | | | | | 0000000 |
| 153 | F884 | | ; | | | | | | | 0000000 |
| 154 | F884 | A0 00 | R1 | LDY #WHSYS | | | | | | 0000000 |
| 155 | F886 | 20 A8 FD | | JSR PUTSTR | PRINT "WHICH SYSTEM?" | | | | | 0000000 |
| 156 | F889 | A9 16 | | LDA #%00010110 | TURN OFF DEVICE INTERRUPTS | | | | | |
| 157 | F88B | 8D 00 0C | | STA DUARTS | | | | | | |
| 158 | F88E | A0 00 | | LDY #00 | SET CHARACTER COUNTER TO 0 | | | | | |
| 159 | F890 | A2 FF | | LDX #$FF | SET VALUES FOR DELAY LOOP | | | | | |
| 160 | F892 | 86 2C | | STX TEMP+1 | | | | | | |
| 161 | F894 | A9 40 | G0 | LDA #$40 | | | | | | |
| 162 | F896 | 85 2C | | STA TEMP+1 | | | | | | |
| 163 | F898 | C6 2C | G1 | DEC TEMP+1 | DECREMENT TEMP+1 | | | | | |
| 164 | F89A | D0 FC | | BNE G1 | LOOP UNTIL 0 | | | | | |
| 165 | F89C | C6 2B | | DEC TEMP | NOW DECREMENT TEMP | | | | | |
| 166 | F89E | F0 03 | | BEQ *+5 | IF NOT 0, JUMP TO G3 | | | | | |
| 167 | F8A0 | 4C AD F8 | | JMP G3 | | | | | | |
| 168 | F8A3 | CA | | DEX | OTHERWISE DECREMENT X | | | | | |
| 169 | F8A4 | D0 03 | | BNE *+5 | IF 0, GO TO GEND | | | | | |
| 170 | F8A6 | 4C E0 F8 | | JMP GEND | | | | | | |
| 171 | F8A9 | A9 FF | | LDA #$FF | OTHERWISE RESET TEMP | | | | | |
| 172 | F8AB | 85 2B | | STA TEMP | AND CONTINUE | | | | | |
| 173 | F8AD | AD 00 0C | G3 | LDA DUARTS | SEE IF CHARACTER IS READY | | | | | |
| 174 | F8B0 | 29 01 | | AND #%00000001 | | | | | | |
| 175 | F8B2 | F0 F0 | | BEQ G0 | | | | | | |
| 176 | F8B4 | AD 01 0C | | LDA DUARTD | GET THE CHARACTER | | | | | |
| 177 | F8B7 | 29 7F | | AND #$7F | ELIMINATE PARITY | | | | | |
| 178 | F8B9 | C9 40 | | CMP #$40 | IF ITS ALPHABETIC, ELIMINATE CASE ALSO | | | | | |
| 179 | F8BB | 30 02 | | BMI G4 | OTHERWISE, GO TO G4 | | | | | |
| 180 | F8BD | 29 5F | | AND #$5F | | | | | | |
| 181 | F8BF | 99 2E 00 | G4 | STA STRING,Y | | | | | | |
| 182 | F8C2 | C9 0D | | CMP #$0D | DID SHE TYPE A CR? | | | | | |
| 183 | F8C4 | F0 08 | | BEQ GLF | IF YES, ALL DONE; ECHO A CRLF | | | | | |
| 184 | F8C6 | C0 04 | | CPY #04 | HAS SHE TYPED 5 CHARACTERS? | | | | | |
| 185 | F8C8 | F0 09 | | BEQ GCRLF | IF SO, ECHO A CR AND LF | | | | | |
| 186 | F8CA | C8 | | INY | NOT DONE YET; WAIT FOR MORE CHARACTERS | | | | | |
| 187 | F8CB | 4C 94 F8 | | JMP G0 | | | | | | |
| 188 | F8CE | A0 75 | GLF | LDY #LF | SEND A LF TO DEVICE | | | | | |
| 189 | F8D0 | 4C D5 F8 | | JMP GPUT | | | | | | |
| 190 | F8D3 | A0 74 | GCRLF | LDY #CRLF | SEND A CRLF TO DEVICE | | | | | |
| 191 | F8D5 | 20 A8 FD | GPUT | JSR PUTSTR | | | | | | |
| 192 | F8D8 | A9 96 | | LDA #%10010110 | RESTORE DEVICE INTERRUPTS | | | | | |
| 193 | F8DA | 8D 00 0C | | STA DUARTS | | | | | | |
| 194 | F8DD | 4C F2 F8 | | JMP R2 | | | | | | |
| 195 | F8E0 | A0 74 | GEND | LDY #CRLF | SEND CRLF TO DEVICE | | | | | |
| 196 | F8E2 | 20 A8 FD | | JSR PUTSTR | | | | | | |
| 197 | F8E5 | A0 9F | | LDY #LINKTO | SEND DESTINATION ADDRESS TIME OUT TO DEVICE | | | | | |
| 198 | F8E7 | 20 A8 FD | | JSR PUTSTR | | | | | | |
| 199 | F8EA | A9 96 | | LDA #%10010110 | RESTORE DEVICE INTERRUPTS | | | | | |
| 200 | F8EC | 8D 00 0C | | STA DUARTS | | | | | | |
| 201 | F8EF | 4C 49 F9 | | JMP NONE | | | | | | |
| 202 | F8F2 | A2 00 | R2 | LDX #00 | START SEARCH FOR STRING IN TESTER | | | | | |
| 203 | F8F4 | A0 00 | R3 | LDY #00 | | | | | | 0000000 |
| 204 | F8F6 | B9 2E 00 | R4 | LDA STRING,Y | | | | | | 0000000 |
| 205 | F8F9 | DD DA FD | | CMP TESTER,X | | | | | | 0000000 |
| 206 | F8FC | D0 09 | | BNE R5 | | | | | | 0000000 |
| 207 | F8FE | C0 02 | | CPY #02 | IS THIS THIRD CHARACTER ? | | | | | 0000000 |
| 208 | F900 | F0 19 | | BEQ R7 | YES, WE HAVE A MATCH | | | | | 0000000 |
| 209 | F902 | C8 | | INY | | | | | | 0000000 |
| 210 | F903 | E8 | | INX | | | | | | 0000000 |
| 211 | F904 | 4C F6 F8 | | JMP R4 | | | | | | 0000000 |
| 212 | F907 | 8A | R5 | TXA | | | | | | 0000000 |
| 213 | F908 | 84 2B | | STY TEMP | NO MATCH, SO TRY THE NEXT SYSTEM | | | | | 0000000 |
| 214 | F90A | 38 | | SEC | | | | | | 0000000 |
| 215 | F90B | E5 2B | | SBC TEMP | | | | | | 0000000 |
| 216 | F90D | 18 | | CLC | | | | | | 0000000 |
| 217 | F90E | 69 06 | | ADC #06 | SIX BYTES PER ENTRY | | | | | 0000000 |

```
CARD # LOC    CODE       CARD  10        20        30        40        50        60           70
218   F910  C9 18              CMP #24        MORE SYSTEMS TO TRY (FOR 4 ENTRIES)?        0000000
219   F912  D0 03              BNE R6                                                     0000000
220   F914  4C 84 F8           JMP R1         ENTRY NOT FOUND. SO ASK HER AGAIN           0000000
221   F917  AA         R6      TAX                                                        0000000
222   F918  4C F4 F8           JMP R3         TRY THE NEXT ENTRY IN THE TABLE             0000000
223   F91B  E0 02      R7      CPX #02        A MATCH WAS FOUND IN TESTER                 0000000
224   F91D  F0 0A              BEQ R8         IF "TERMX", GET THE TERMINAL ADDRESS        0000000
225   F91F  E8                 INX            ELSE GET THE ADDRESS FROM THE TABLE         0000000
226   F920  BD DA FD           LDA TESTER,X   ACC = DA                                    0000000
227   F923  E8                 INX            POINT TO PACKET LENGTH IN TABLE             0000000
228   F924  A0 03              LDY #3         WAIT 3/4 SECOND FOR A REPLY TO THE SIGN-ON  0000000
229   F926  4C 2F F9           JMP R9                                                     0000000
230   F929  A2 04      R8      LDX #04        GET DA FROM "X" IN "TERMX"                  0000000
231   F92B  B5 2E              LDA STRING,X                                               0000000
232   F92D  A0 28              LDY #40        WAIT 10 SECONDS FOR A REPLY TO THE SIGN-ON  0000000
233   F92F  85 41      R9      STA XADDR      SAVE THE DESTINATION ADDR                   0000000
234   F931  84 2A              STY TSACK      THE TIME TO WAIT FOR THE REPLY              0000000
235   F933  BD DA FD           LDA TESTER,X   GET THE PACKET LENGTH FROM THE TABLE        0000000
236   F936  85 44              STA MAXPAX     STORE MAXIMUM PACKET LENGTH                 0000000
237   F938  BD D9 FD           LDA TESTER+1,X GET THE # OF XMIT BUFFERS                   0000000
238   F93B  85 42              STA NUMDAT     SAVE THE # OF XMIT BUFFERS FOR LATER        0000000
239   F93D  A2 E2              LDX #SONMSG+TTY CONNECTION MSG FOR ASCII TERMINAL          0000000
240   F93F  20 76 FD           JSR BCONST     CONSTRUCT THE PACKET                        0000000
241   F942  A2 05              LDX #BIUCRE                                                0000000
242   F944  20 64 FD           JSR BUMP       BUMP THE BIU-CREATED BUFFER PTRS            0000000
243   F947  E6 20              INC WAIT       REMEMBER THAT WE ARE WAITING FOR A REPLY    0000000
244   F949  58         NONE    CLI            ALLOW INTERRUPTS                            0000000
246   F94A              ;                                                                 0000000
247   F94A              ; MLOOP IS THE MAIN LOOP. IT REPEATEDLY CALLS NET, DEV AND CKTOUT 0000000
248   F94A              ; UNTIL RESET IS HIT BY THE USER.                                 0000000
249   F94A              ;                                                                 0000000
250   F94A  20 56 F9   MLOOP   JSR NET        HANDLE AN OUTGOING MESSAGE                  0000000
251   F94D  20 E4 F9           JSR DEV        HANDLE AN INCOMING MESSAGE                  0000000
252   F950  20 96 FA           JSR CKTOUT     CHECK FOR ANY TIMEOUTS                      0000000
253   F953  4C 4A F9           JMP MLOOP      AND LOOP FOREVER                            0000000
255   F956              ;                                                                 0000000
256   F956              ; NET IS CALLED TO OUTPUT A MESSAGE ONTO THE NETWORK. IF IT       0000000
257   F956              ; CAN'T FOR ANY REASON, IT RETURNS AND TRIES AGAIN THE NEXT TIME  0000000
258   F956              ; IT IS CALLED.                                                   0000000
259   F956              ;                                                                 0000000
260   F956  AD 00 08   NET     LDA NUARTS     IS THE NETWORK BUSY?                        0000000
261   F959  29 04              AND #%00000100                                             0000000
262   F95B  D0 01              BNE *+3        IF IT IS, RETURN                            0000000
263   F95D  60         NRET    RTS                                                        0000000
264   F95E  A2 00              LDX #XNET      ASSUME XMITTING DATA MSG                    0000000
265   F960  A5 0D              LDA PACNUM+XDEV ANY PACKETS TO GO OUT?                     0000000
266   F962  F0 06              BEQ CKBIU      NO, SO SEE IF ANY BIU-CREATED PACKETS       0000000
267   F964  C5 0C              CMP PACNUM+XNET HAVE WE CAUGHT UP TO COMPLETED PACKETS?    0000000
268   F966  F0 02              BEQ CKBIU      YES, SO CHECK BIU PACKETS                   0000000
269   F968  B0 06              BCS GOTONE     NO, SO WE HAVE A PACKET TO OUTPUT           0000000
270   F96A  A5 11      CKBIU   LDA PACNUM+BIUCRE ANY BIU-CREATED PACKETS?                 0000000
271   F96C  F0 EF              BEQ NRET       NO, SO RETURN                               0000000
272   F96E  A2 04              LDX #BIUXMT    XMITTING BIU-CREATED PACKET                 0000000
273   F970  86 21      GOTONE  STX CURTAB     SAVE THE TABLE INDEX                        0000000
274   F972  B5 00              LDA BUFL,X     MOVE THE LOW AND HIGH PARTS ...             0000000
275   F974  85 12              STA TEMPTR     OF THE BUFFER PTR TO TEMPTR                 0000000
276   F976  B5 06              LDA BUFH,X                                                 0000000
277   F978  85 13              STA TEMPTR+1                                               0000000
278   F97A  A5 1D              LDA RNDCNT     IS RANDOM BACKOFF ACTIVE?                   0000000
279   F97C  F0 04              BEQ M1                                                     0000000
280   F97E  C6 1D      M0      DEC RNDCNT     COUNTDOWN RANDOM WAIT                       0000000
281   F980  D0 FC              BNE M0                                                     0000000
282   F982  A2 00      M1      LDX #00        SET X = 0 FOR LWT CHECKING                  0000000
283   F984  A9 94              LDA #%10010100 TURN ON XMIT KEY                            0000000
284   F986  8D 00 08           STA NUARTS                                                 0000000
285   F989  85 1C              STA XMIT       SET XMIT FLAG TO NONZERO VALUE              0000000
286   F98B  A0 FF              LDY #$FF                                                   0000000
287   F98D  C8         M2      INY                                                        0000000
288   F98E  A5 1C      M3      LDA XMIT       HAS XMIT FLAG BEEN RESET ?                  0000000
289   F990  F0 51              BEQ NRET       RETURN IF IT HAS                            0000000
290   F992  AD 00 08           LDA NUARTS     IS XMIT BUFFER EMPTY?                       0000000
291   F995  29 02              AND #%00000010                                             0000000
292   F997  F0 F5              BEQ M3                                                     0000000
293   F999  B1 12              LDA (TEMPTR),Y WRITE WORD TO NETWORK                       0000000
294   F99B  8D 01 08           STA NUARTD                                                 0000000
295   F99E  C0 07              CPY #07        IS THIS THE PACKET BYTE COUNT?              0000000
296   F9A0  D0 EB              BNE M2                                                     0000000
297   F9A2  85 14              STA TEMPBC     IF SO, STORE FOR LATER CHECKING             0000000
298   F9A4  4C B8 F9           JMP M6                                                     0000000
299   F9A7  C8         M4      INY            INCREMENT Y AND                             0000000
300   F9A8  A5 1C      M5      LDA XMIT       HAS XMIT FLAG BEEN RESET ?                  0000000
301   F9AA  F0 37              BEQ NRET       IF SO, RETURN                               0000000
302   F9AC  AD 00 08           LDA NUARTS     OUTPUT NEXT WORD TO NETWORK                 0000000
303   F9AF  29 02              AND #%00000010                                             0000000
304   F9B1  F0 F5              BEQ M5                                                     0000000
305   F9B3  B1 12              LDA (TEMPTR),Y                                             0000000
306   F9B5  8D 01 08           STA NUARTD                                                 0000000
307   F9B8  C4 14      M6      CPY TEMPBC     IS THIS THE LAST WORD IN PACKET?            0000000
308   F9BA  D0 EB              BNE M4         IF NOT, GO TO M4                            0000000
309   F9BC  A5 1C              LDA XMIT       HAS XMIT BEEN TURNED OFF BY NMI ?           0000000
```

| CARD # | LOC | CODE | CARD | 10 | 20 | 30 | 40 | 50 | 60 | 70 | |
|---|---|---|---|---|---|---|---|---|---|---|---|
| 310 | F9BE | F0 23 | | BEQ NRET | | IF SO, RETURN | | | | | 0000000 |
| 311 | F9C0 | A6 21 | | LDX CURTAB | | BUMP PTRS FOR THE BUFFERS BEING USED | | | | | 0000000 |
| 312 | F9C2 | 20 64 FD | | JSR BUMP | | | | | | | 0000000 |
| 313 | F9C5 | 78 | | SEI | | SEE IF ALL BUFFERS HAVE BEEN XMITED | | | | | 0000000 |
| 314 | F9C6 | 8A | | TXA | | CHECK TO SEE IF OUTPUTING BIU-CREATED PACKET | | | | | 0000000 |
| 315 | F9C7 | D0 06 | | BNE COMP | | YES, SO DON'T CHECK FOR INCOMING PACKET | | | | | 0000000 |
| 316 | F9C9 | A5 18 | | LDA DINTBC | | IS A PACKET BEING TYPED IN? | | | | | 0000000 |
| 317 | F9CB | C9 08 | | CMP #08 | | LENGTH OF 8 MEANS NO | | | | | 0000000 |
| 318 | F9CD | D0 03 | | BNE *+5 | | IF YES, DON'T DO THE COMPARE | | | | | 0000000 |
| 319 | F9CF | 20 45 FD | COMP | JSR ACOMP | | COMPARE THE PACNUMS AND UPDATE PTRS | | | | | 0000000 |
| 320 | F9D2 | 58 | | CLI | | | | | | | 0000000 |
| 321 | F9D3 | E6 22 | | INC NUMXMT | | INCR THE # OF XMITTED PACKETS | | | | | 0000000 |
| 322 | F9D5 | D0 02 | | BNE *+4 | | IF WE PASSED $FF ... | | | | | 0000000 |
| 323 | F9D7 | C6 22 | | DEC NUMXMT | | BACK UP ONE | | | | | 0000000 |
| 324 | F9D9 | A2 28 | | LDX #40 | | DELAY TURNING OFF THE KEY | | | | | 0000000 |
| 325 | F9DB | CA | BLOOP | DEX | | | | | | | 0000000 |
| 326 | F9DC | 10 FD | | BPL BLOOP | | | | | | | 0000000 |
| 327 | F9DE | A9 54 | | LDA #%01010100 | | TURN OFF XMIT KEY (THIS MUST OCCUR | | | | | 0000000 |
| 328 | F9E0 | 8D 00 08 | | STA NUARTS | | AT LEAST 66 USEC AFTER LAST BYTE) | | | | | 0000000 |
| 329 | F9E3 | 60 | NRET | RTS | | RETURN TO CALLER | | | | | 0000000 |
| 331 | F9E4 | | | ; | | | | | | | 0000000 |
| 332 | F9E4 | | | ; DEV IS CALLED TO HANDLE A MESSAGE FROM THE NETWORK. IT WILL | | | | | | | 0000000 |
| 333 | F9E4 | | | ; EITHER TRANSMIT THE MESSAGE TO THE USER DEVICE OR HANDLE THE | | | | | | | 0000000 |
| 334 | F9E4 | | | ; MESSAGE ITSELF, DEPENDING ON THE MESSAGE TYPE. | | | | | | | 0000000 |
| 335 | F9E4 | | | ; | | | | | | | 0000000 |
| 336 | F9E4 | A5 0F | DEV | LDA PACNUM+RNET | | ANY PACKETS WAITING FOR DEVICE? | | | | | 0000000 |
| 337 | F9E6 | F0 FB | | BEQ NRET | | NO, SO RETURN | | | | | 0000000 |
| 338 | F9E8 | A5 02 | | LDA BUFL+RDEV | | COPY THE BUFFER PTR | | | | | 0000000 |
| 339 | F9EA | 85 12 | | STA TEMPTR | | | | | | | 0000000 |
| 340 | F9EC | A5 08 | | LDA BUFH+RDEV | | | | | | | 0000000 |
| 341 | F9EE | 85 13 | | STA TEMPTR+1 | | | | | | | 0000000 |
| 342 | F9F0 | A0 05 | | LDY #05 | | READ MESSAGE TYPE | | | | | 0000000 |
| 343 | F9F2 | B1 12 | | LDA (TEMPTR),Y | | FROM THE INCOMING MESSAGE | | | | | 0000000 |
| 344 | F9F4 | C9 02 | | CMP #DATMSG+2 | | IS THIS A DATA PACKET ? | | | | | 0000000 |
| 345 | F9F6 | D0 24 | | BNE RP4 | | IF NOT, GO TO RP4 | | | | | 0000000 |
| 346 | F9F8 | A4 40 | | LDY CONECT | | IS DEVICE CONNECTED ? | | | | | 0000000 |
| 347 | F9FA | D0 03 | | BNE *+5 | | IF YES, PRINT THE DATA | | | | | 0000000 |
| 348 | F9FC | 4C 89 FA | | JMP RP9 | | IF NOT, IGNORE THE DATA PACKET | | | | | 0000000 |
| 349 | F9FF | | | ; | | | | | | | 0000000 |
| 350 | F9FF | | | ; PRINT THE DATA IN THE MSG TO THE DEVICE | | | | | | | 0000000 |
| 351 | F9FF | | | ; | | | | | | | 0000000 |
| 352 | F9FF | A0 07 | | LDY #07 | | GET THE LENGTH OF THE DATA PACKET | | | | | 0000000 |
| 353 | FA01 | B1 12 | | LDA (TEMPTR),Y | | | | | | | 0000000 |
| 354 | FA03 | 85 14 | | STA TEMPBC | | SAVE THE BYTE COUNT | | | | | 0000000 |
| 355 | FA05 | C4 14 | RP2 | CPY TEMPBC | | COMPARE Y WITH PACKET LENGTH | | | | | 0000000 |
| 356 | FA07 | 90 03 | | BCC RPSKP | | IF > OR = , GO TO RP9 | | | | | 0000000 |
| 357 | FA09 | 4C 89 FA | | JMP RP9 | | | | | | | 0000000 |
| 358 | FA0C | C8 | RPSKP | INY | | OTHERWISE, SEND DATA TO DEVICE | | | | | 0000000 |
| 359 | FA0D | AD 00 0C | RP3 | LDA DUARTS | | FIRST CHECK IF TRANSMITTER IS EMPTY | | | | | 0000000 |
| 360 | FA10 | 29 02 | | AND #%00000010 | | | | | | | 0000000 |
| 361 | FA12 | F0 F9 | | BEQ RP3 | | | | | | | 0000000 |
| 362 | FA14 | B1 12 | | LDA (TEMPTR),Y | | THEN SEND DATA | | | | | 0000000 |
| 363 | FA16 | 8D 01 0C | | STA DUARTD | | | | | | | 0000000 |
| 364 | FA19 | 4C 05 FA | | JMP RP2 | | | | | | | 0000000 |
| 365 | FA1C | | | ; | | | | | | | 0000000 |
| 366 | FA1C | | | ; THE FOLLOWING SECTIONS CHECK FOR SPECIAL MESSAGES | | | | | | | 0000000 |
| 367 | FA1C | | | ; | | | | | | | 0000000 |
| 368 | FA1C | 85 2B | RP4 | STA TEMP | | TEMPORARILY SAVE TO CHECK FOR SIGN-ON REQUEST | | | | | 0000000 |
| 369 | FA1E | 29 E0 | | AND #SONMSG | | AND OUT TERMINAL TYPE FOR SIGN-ON | | | | | 0000000 |
| 370 | FA20 | C9 E0 | | CMP #SONMSG | | TEST FOR SIGN-ON REQUEST PACKET | | | | | 0000000 |
| 371 | FA22 | D0 49 | | BNE RP6 | | | | | | | 0000000 |
| 372 | FA24 | A4 40 | | LDY CONECT | | ARE WE CONNECTED ? | | | | | 0000000 |
| 373 | FA26 | F0 03 | | BEQ *+5 | | IF SO, IGNORE THE SIGN-ON REQUEST | | | | | 0000000 |
| 374 | FA28 | 4C 89 FA | | JMP RP9 | | | | | | | 0000000 |
| 375 | FA2B | A4 20 | | LDY WAIT | | ARE WE WAITING FOR A SIGN-ON ACK ? | | | | | 0000000 |
| 376 | FA2D | F0 03 | | BEQ *+5 | | IF SO, IGNORE THE REQUEST | | | | | 0000000 |
| 377 | FA2F | 4C 89 FA | | JMP RP9 | | | | | | | 0000000 |
| 378 | FA32 | A0 8C | | LDY #LINKR1 | | PRINT THE FIRST HALF OF "LINK REQUEST" MESSAGE | | | | | 0000000 |
| 379 | FA34 | 20 A8 FD | | JSR PUTSTR | | | | | | | 0000000 |
| 380 | FA37 | A0 02 | | LDY #02 | | GET THE ADDR OF THE REQUESTING BIU | | | | | 0000000 |
| 381 | FA39 | B1 12 | | LDA (TEMPTR),Y | | HAVE TO LOAD IT INTO A | | | | | 0000000 |
| 382 | FA3B | A8 | | TAY | | SAVE IT IN Y | | | | | 0000000 |
| 383 | FA3C | 84 41 | | STY XADDR | | AND IN XADDR | | | | | 0000000 |
| 384 | FA3E | AD 00 0C | PLOOP | LDA DUARTS | | GET DEVICE UART STATUS | | | | | 0000000 |
| 385 | FA41 | 29 02 | | AND #%00000010 | | WAIT FOR FAVORABLE STATUS | | | | | 0000000 |
| 386 | FA43 | F0 F9 | | BEQ PLOOP | | | | | | | 0000000 |
| 387 | FA45 | 8C 01 0C | | STY DUARTD | | WRITE THE ADDRESS TO THE DEVICE | | | | | 0000000 |
| 388 | FA48 | A0 74 | | LDY #CRLF | | | | | | | 0000000 |
| 389 | FA4A | 20 A8 FD | | JSR PUTSTR | | | | | | | 0000000 |
| 390 | FA4D | AD DE FD | | LDA TESTER+4 | | GET THE MAX # OF CHARS PER PACKET | | | | | 0000000 |
| 391 | FA50 | 85 44 | | STA MAXPAX | | | | | | | 0000000 |
| 392 | FA52 | AD DF FD | | LDA TESTER+5 | | GET THE # OF XMIT PACKETS | | | | | 0000000 |
| 393 | FA55 | 85 42 | | STA NUMDAT | | | | | | | 0000000 |
| 394 | FA57 | A2 DF | | LDX #SACMSG | | LINK ACCEPT MSG TYPE | | | | | 0000000 |
| 395 | FA59 | 20 76 FD | | JSR BCONST | | CONSTRUCT THE PACKET | | | | | 0000000 |
| 396 | FA5C | A2 05 | | LDX #BIUCRE | | | | | | | 0000000 |
| 397 | FA5E | 20 64 FD | | JSR BUMP | | BUMP THE BUFFER PTRS TO SEND THE PACKET | | | | | 0000000 |
| 398 | FA61 | | | ; | | | | | | | |
| 399 | FA61 | A9 01 | RP5 | LDA #01 | | SET CONNECTED FLAG | | | | | |

```
CARD # LOC     CODE        CARD   10        20        30        40        50        60        70
 400   FA63   85 40                  STA CONECT   NOW CONNECTED                                        0000000
 401   FA65   A0 C6                  LDY #LINKA   YES, SO PRINT "LINK ACCEPTED"                         0000000
 402   FA67   20 A8 FD               JSR PUTSTR                                                        0000000
 403   FA6A   4C 89 FA               JMP RP9                                                           0000000
 404   FA6D                  ;                                                                         0000000
 405   FA6D   A5 2B        RP6       LDA TEMP     RESTORE THE MESSAGE TYPE                              0000000
 406   FA6F   C9 DF                  CMP #SACMSG  TEST FOR SIGN-ON ACKNOWLEDGEMENTS                     0000000
 407   FA71   D0 09                  BNE RP7                                                           0000000
 408   FA73   A4 20                  LDY WAIT     WERE WE WAITING?                                      0000000
 409   FA75   F0 12                  BEQ RP9      NO, SO IGNORE                                         0000000
 410   FA77   C6 20                  DEC WAIT     NO LONGER WAITING                                     0000000
 411   FA79   4C 61 FA               JMP RP5      PRINT "LINK ACCEPTED"                                 0000000
 412   FA7C                  ;                                                                         0000000
 413   FA7C   C9 DE        RP7       CMP #SOFMSG  TEST FOR SIGN-OFF MESSAGE TYPE                        0000000
 414   FA7E   D0 09                  BNE RP9                                                           0000000
 415   FA80   A0 7A                  LDY #LINKT                                                        0000000
 416   FA82   20 A8 FD               JSR PUTSTR   WRITE "LINK TERMINATED"                               0000000
 417   FA85   A9 00                  LDA #00                                                           0000000
 418   FA87   85 40                  STA CONECT   NO LONGER CONNECTED                                   0000000
 419   FA89                                                                                            0000000
 420   FA89                  ; FUTURE MESSAGE TYPES WILL BE PROCESSED HERE                             0000000
 421   FA89                  ;                                                                         0000000
 422   FA89   A2 02        RP9       LDX #RDEV    BUMP THE BUFFER PTRS                                  0000000
 423   FA8B   20 64 FD               JSR BUMP                                                          0000000
 424   FA8E   78                     SEI                                                               0000000
 425   FA8F   A2 02                  LDX #RDEV                                                         0000000
 426   FA91   20 45 FD               JSR ACOMP    UPDATE PTRS IF NECESSARY                              0000000
 427   FA94   58                     CLI          ENABLE INTERRUPTS                                     0000000
 428   FA95   60                     RTS          AND RETURN TO CALLER                                  0000000
 430   FA96                                                                                            0000000
 431   FA96                  ; CKTOUT CHECKS FOR ANY TIMEOUTS AND TAKES APPROPRIATE ACTIONS            0000000
 432   FA96                  ; IF ANY ARE DETECTED.                                                    0000000
 433   FA96                  ;                                                                         0000000
 434   FA96   A5 20        CKTOUT    LDA WAIT     ARE WE WAITING FOR A SIGN-ON ACK?                     0000000
 435   FA98   F0 0F                  BEQ CKSTAT   NO, SO CHECK FOR STATUS MSG                           0000000
 436   FA9A   A5 24                  LDA TOD      YES, SO CHECK TSACK AGAINST TOD                       0000000
 437   FA9C   C5 2A                  CMP TSACK    ONLY NEED TO COMPARE ONE BYTE IN THIS CASE            0000000
 438   FA9E   90 09                  BCC CKSTAT   IF <, THEN NO TIMEOUT                                 0000000
 439   FAA0   A0 D6                  LDY #NOVAIL  PRINT "SYSTEM NOT AVAILABLE"                          0000000
 440   FAA2   20 A8 FD               JSR PUTSTR                                                        0000000
 441   FAA5   78                     SEI          RESET ASSUMES INTERRUPTS TURNED OFF                   0000000
 442   FAA6   4C 30 F8               JMP RESTRT   ASK FOR A NEW SYSTEM                                  0000000
 443   FAA9                  ;                                                                         0000000
 444   FAA9   A5 26        CKSTAT    LDA TOD+2    SEE IF ITS TIME TO SEND A STATUS MSG                  0000000
 445   FAAB   C5 29                  CMP TSTAT+2                                                       0000000
 446   FAAD   90 6E                  BCC CKRET                                                         0000000
 447   FAAF   D0 0E                  BNE SNDSTA                                                        0000000
 448   FAB1   A5 25                  LDA TOD+1                                                         0000000
 449   FAB3   C5 28                  CMP TSTAT+1                                                       0000000
 450   FAB5   90 66                  BCC CKRET                                                         0000000
 451   FAB7   D0 06                  BNE SNDSTA                                                        0000000
 452   FAB9   A5 24                  LDA TOD                                                           0000000
 453   FABB   C5 27                  CMP TSTAT                                                         0000000
 454   FABD   90 5E                  BCC CKRET                                                         0000000
 455   FABF   A2 DB        SNDSTA    LDX #STAMSG  SEND A STATUS MSG                                     0000000
 456   FAC1   20 76 FD               JSR BCONST                                                        0000000
 457   FAC4   A0 00                  LDY #00      TO ADDRESS $00                                        0000000
 458   FAC6   98                     TYA                                                               0000000
 459   FAC7   91 19                  STA (BIUPTR),Y                                                    0000000
 460   FAC9   A9 29                  LDA #41      PACKET LENGTH OF 42                                   0000000
 461   FACB   A0 07                  LDY #07                                                           0000000
 462   FACD   91 19                  STA (BIUPTR),Y                                                    0000000
 463   FACF   C8                     INY          POINT TO FIRST BYTE OF STATUS PART                    0000000
 464   FAD0   A5 22                  LDA NUMXMT   # OF XMITTED MSGS SINCE LAST STATUS MSG               0000000
 465   FAD2   91 19                  STA (BIUPTR),Y                                                    0000000
 466   FAD4   A9 00                  LDA #00      RESET IT TO ZERO                                      0000000
 467   FAD6   85 22                  STA NUMXMT                                                        0000000
 468   FAD8   C8                     INY                                                               0000000
 469   FAD9   91 19                  STA (BIUPTR),Y  NEXT FIELD IS ZERO                                 0000000
 470   FADB   C8                     INY                                                               0000000
 471   FADC   AA                     TAX          SAVE THE ZERO FOR LATER                               0000000
 472   FADD   A5 23                  LDA NUMCOL   # OF COLLISIONS SINCE LAST STATUS MSG                 0000000
 473   FADF   91 19                  STA (BIUPTR),Y                                                    0000000
 474   FAE1   86 23                  STX NUMCOL   RESET IT TO ZERO                                      0000000
 475   FAE3   C8                     INY                                                               0000000
 476   FAE4   38                     SEC          FOR SUBTRACTION                                       0000000
 477   FAE5   A5 0D                  LDA PACNUM+XDEV GET # OF PACKETS IN THE XMIT BUFFERS               0000000
 478   FAE7   E5 0C                  SBC PACNUM+XNET SUBTRACT # OF THOSE SENT OUT TO THE NET            0000000
 479   FAE9   91 19                  STA (BIUPTR),Y  RESULT IS # OF PACKETS WAITING TO BE XMITTED       0000000
 480   FAEB   C8                     INY                                                               0000000
 481   FAEC   38                     SEC                                                               0000000
 482   FAED   A5 0F                  LDA PACNUM+RNET GET # OF PACKETS IN THE RECEIVE BUFFERS            0000000
 483   FAEF   E5 0E                  SBC PACNUM+RDEV SUBTRACT # OF THOSE GIVEN TO THE DEVICE            0000000
 484   FAF1   91 19                  STA (BIUPTR),Y  RESULT IS # OF PACKETS WAITING FOR THE DEVICE      0000000
 485   FAF3   C8                     INY                                                               0000000
 486   FAF4   AD 00 08               LDA NUARTS   NETWORK UART STATUS                                   0000000
 487   FAF7   91 19                  STA (BIUPTR),Y                                                    0000000
 488   FAF9   C8                     INY                                                               0000000
 489   FAFA   AD 00 0C               LDA DUARTS   DEVICE UART STATUS                                    0000000
```

```
CARD # LOC    CODE      CARD  10       20          30           40          50          60        70
490  FAFD  91 19              STA (BIUPTR),Y                                                      0000000
491  FAFF  C8                 INY                                                                  0000000
492  FB00  AD 0D 10           LDA PIFR          PARALLEL PORT INTERRUPT FLAG REGISTER              0000000
493  FB03  91 19              STA (BIUPTR),Y                                                      0000000
494  FB05  C8                 INY                                                                  0000000
495  FB06  8A                 TXA               NEXT TWO FIELDS ARE ZERO                           0000000
496  FB07  91 19              STA (BIUPTR),Y                                                      0000000
497  FB09  C8                 INY                                                                  0000000
498  FB0A  91 19              STA (BIUPTR),Y                                                      0000000
499  FB0C  C8                 INY                                                                  0000000
500  FB0D  A5 41              LDA XADDR         THE CURRENT XMIT ADDRESS                           0000000
501  FB0F  91 19              STA (BIUPTR),Y                                                      0000000
502  FB11  A2 05              LDX #BIUCRE       SEND THE STATUS MSG                                0000000
503  FB13  20 64 FD           JSR BUMP                                                             0000000
504  FB16  A9 F0              LDA #$40          THE NEXT STATUS MSG GOES OUT IN 1 MINUTE           0000000
505  FB18  A2 27              LDX #TSTAT                                                           0000000
506  FB1A  20 BE FD           JSR STIMER                                                           0000000
507  FB1D               ;                                                                          0000000
508  FB1D  60          CKRET  RTS                                                                  0000000
510  FB1E               ;                                                                          0000000
511  FB1E               ; PROM # 2 STARTS HERE                                                     0000000
512  FB1E               ;                                                                          0000000
513  FB1E                      *=$FC00                                                             0000000
514  FC00  48          IRQ    PHA               PUSH ACC AND Y ONTO STACK                          0000000
515  FC01  98                 TYA                                                                  0000000
516  FC02  48                 PHA                                                                  0000000
517  FC03  AD 00 08           LDA NUARTS        IS NETWORK CAUSE OF INTERRUPT?                     0000000
518  FC06  30 0B              BMI NINT          YES                                                0000000
519  FC08  AD 00 0C           LDA DUARTS        IS DEVICE CAUSE OF INTERRUPT?                      0000000
520  FC0B  10 03              BPL *+5                                                              0000000
521  FC0D  4C B4 FC           JMP DINT          YES                                                0000000
522  FC10  4C 14 FD           JMP TINT          NO, SO ITS THE TIMER                               0000000
523  FC13               ;                                                                          0000000
524  FC13               ; NINT IS THE NETWORK UART INTERRUPT HANDLER. IT IS USED TO EITHER         0000000
525  FC13               ; CHECK LWT VALIDITY, OR TO READ IN A MSG FROM ANOTHER BIU.                0000000
526  FC13               ;                                                                          0000000
527  FC13  A5 1C       NINT   LDA XMIT          IS THIS MY TRANSMISSION?                           0000000
528  FC15  F0 3A              BEQ N4            IF NOT, GO TO N4                                   0000000
529  FC17  AD 01 08           LDA NUARTD                                                           0000000
530  FC1A  95 1E              STA TOKEN,X       SAVE RECEIVED DATA IN TOKEN                        0000000
531  FC1C  E8                 INX                                                                  0000000
532  FC1D  E0 02              CPX #02           HAVE 2 CHARACTERS BEEN RECEIVED?                   0000000
533  FC1F  F0 03              BEQ N0            YES, SO TEST THEM                                  0000000
534  FC21  4C 30 FD           JMP RET           NO, SO HAVE TO WAIT                                0000000
535  FC24  A0 01       N0     LDY #01           TEST RCV'D VS. TRANSMITTED DATA                    0000000
536  FC26  B9 1E 00    N1     LDA TOKEN,Y                                                          0000000
537  FC29  D1 12              CMP (TEMPTR),Y                                                       0000000
538  FC2B  D0 0B              BNE N2                                                               0000000
539  FC2D  88                 DEY                                                                  0000000
540  FC2E  10 F6              BPL N1                                                               0000000
541  FC30  A9 14              LDA #%00010100    TEST OK, TURN OFF NET RCVR                         0000000
542  FC32  8D 00 08           STA NUARTS                                                           0000000
543  FC35  4C 30 FD           JMP RET                                                              0000000
544  FC38  A9 54       N2     LDA #%01010100    TEST FAILED, TURN OFF XMIT AND RCV                 0000000
545  FC3A  8D 00 08           STA NUARTS                                                           0000000
546  FC3D  A5 1B              LDA RANDU         CHOOSE RANDOM WAIT                                 0000000
547  FC3F  0A                 ASL A                                                                0000000
548  FC40  B0 02              BCS N3                                                               0000000
549  FC42  49 47              EOR #71                                                              0000000
550  FC44  85 1B       N3     STA RANDU         STORE NEW RANDOM NUMBER AT                         0000000
551  FC46  85 1D              STA RNDCNT        SEED AND COUNT                                     0000000
552  FC48  F6 23              INC NUMCOL        INC # OF COLLISIONS                                0000000
553  FC4A  D0 02              BNE *+4           IS WRAPPED AROUND ...                              0000000
554  FC4C  C6 23              DEC NUMCOL          RESTORE TO $FF                                   0000000
555  FC4E  4C 30 FD           JMP RET                                                              0000000
556  FC51               ;                                                                          0000000
557  FC51  A5 0F       N4     LDA PACNUM+RNET   START OF RCV FROM ANOTHER DEVICE                   0000000
558  FC53  CD D0 FD           CMP NRBUF         IS THERE AN EMPTY RECEIVE BUFFER?                  0000000
559  FC56  F0 09              BEQ N5            NO                                                 0000000
560  FC58  AD 01 08           LDA NUARTD        GET THE XMIT ADDR                                  0000000
561  FC5B  CD F9 FF           CMP HOME          IS THE PACKET FOR US?                              0000000
562  FC5E  F0 08              BEQ N6            YES                                                0000000
563  FC60  A9 54       N5     LDA #%01010100    CAN'T RECEIVE, SO DISABLE RECEIVER                 0000000
564  FC62  8D 00 08           STA NUARTS                                                           0000000
565  FC65  4C 30 FD           JMP RET           AND RETURN                                         0000000
566  FC68  A4 03       N6     LDY BUFL+RNET     GET THE CURRENT BUFFER PTR                         0000000
567  FC6A  84 15              STY INTPTR                                                           0000000
568  FC6C  A4 09              LDY BUFH+RNET                                                        0000000
569  FC6E  84 16              STY INTPTR+1                                                         0000000
570  FC70  A0 00              LDY #00           STORE BYTE 0 IN BUFFER                             0000000
571  FC72  91 15              STA (INTPTR),Y                                                       0000000
572  FC74  C8          N7     INY                                                                  0000000
573  FC75  AD 00 08    N8     LDA NUARTS        IS ANOTHER WORD READY                              0000000
574  FC78  29 05              AND #%00000101    IS RECEIVE KEY ON BUT WORD NOT IN ?                0000000
575  FC7A  F0 F9              BEQ N8            IF NOT, GO TO N8                                   0000000
576  FC7C  29 04              AND #%00000100    IS RECEIVE KEY ON ?                                0000000
577  FC7E  D0 E0              BNE N5            IF NOT, GO TO N5                                   0000000
578  FC80  AD 01 08           LDA NUARTD        READ SECOND WORD                                   0000000
579  FC83  91 15              STA (INTPTR),Y                                                       0000000
```

```
CARD # LOC    CODE          CARD   10        20        30         40        50        60        70
580  FC85  C0 07                   CPY #07            IS THIS PACKET BYTE COUNT                          0000000
581  FC87  D0 E8                   BNE N7             IF NOT, GO TO N8                                   0000000
582  FC89  85 17                   STA NINTBC         OTHERWISE STORE RECEIVE COUNT                      0000000
583  FC8B  C4 17          N9       CPY NINTBC         DOES Y = PACKET LENGTH ?                           0000000
584  FC8D  F0 14                   BEQ N11            IF YES, GO TO N11                                  0000000
585  FC8F  C8                      INY                READ NEXT WORD                                     0000000
586  FC90  AD 00 08       N10      LDA NUARTS         IS ANOTHER WORD READY?                             0000000
587  FC93  29 05                   AND #%00000101                                                        0000000
588  FC95  F0 F9                   BEQ N10                                                               0000000
589  FC97  29 04                   AND #%00000100                                                        0000000
590  FC99  D0 C5                   BNE N5                                                                0000000
591  FC9B  AD 01 08                LDA NUARTD         READ IN WORD TO ACC                                0000000
592  FC9E  91 15                   STA (INTPTR),Y     STORE                                              0000000
593  FCA0  4C 8B FC                JMP N9                                                                0000000
594  FCA3  A9 54          N11      LDA #%01010100     DISABLE RECEIVER                                   0000000
595  FCA5  8D 00 08                STA NUARTS                                                            0000000
596  FCA8  86 2D                   STX XSAVE          SAVE X                                             0000000
597  FCAA  A2 03                   LDX #RNET          BUMP THE BUFFER PTR                                0000000
598  FCAC  20 64 FD                JSR BUMP                                                              0000000
599  FCAF  A6 2D                   LDX XSAVE          RESTORE X                                          0000000
600  FCB1  4C 30 FD                JMP RET                                                               0000000
602  FCB4                  ;                                                                             0000000
603  FCB4                  ; DINT IS THE DEVICE INTERRUPT HANDLER. IT IS EXECUTED EACH TIME              0000000
604  FCB4                  ; THE USER STRIKES A KEY ON THE KEYBOARD.                                     0000000
605  FCB4                  ;                                                                             0000000
606  FCB4  AD 01 0C       DINT     LDA DUARTD         GET THE DATA                                       0000000
607  FCB7  A4 40                   LDY CONECT         ARE WE CONNECTED?                                  0000000
608  FCB9  D0 03                   BNE *+5                                                               0000000
609  FCBB  4C 30 FD                JMP RET            NO, SO IGNORE THE DATA                             0000000
610  FCBE  A4 0D                   LDY PACNUM+XDEV    ANY SPACE LEFT FOR MORE PACKETS?                   0000000
611  FCC0  C4 42                   CPY NUMDAT                                                            0000000
612  FCC2  D0 03                   BNE *+5                                                               0000000
613  FCC4  4C 30 FD                JMP RET            IF NOT, GO TO RET                                  0000000
614  FCC7  A4 01                   LDY BUFL+XDEV      GET THE BUFFER PTR                                 0000000
615  FCC9  84 15                   STY INTPTR                                                            0000000
616  FCCB  A4 07                   LDY BUFH+XDEV                                                         0000000
617  FCCD  84 16                   STY INTPTR+1                                                          0000000
618  FCCF  A4 18                   LDY DINTBC         GET THE CURRENT BYTE COUNT                         0000000
619  FCD1  C9 04                   CMP #04            IS THIS AN "EOT" CHARACTER                         0000000
620  FCD3  D0 0C                   BNE D1             IF NOT, GO TO D1                                   0000000
621  FCD5  88                      DEY                OTHERWISE END PACKET WITHOUT THE "EOT"             0000000
622  FCD6  98                      TYA                                                                   0000000
623  FCD7  48                      PHA                                                                   0000000
624  FCD8  A0 77                   LDY #KBDIS         SEND 'DISABLE KEYBOARD' TO TERMINAL                0000000
625  FCDA  20 A8 FD                JSR PUTSTR                                                            0000000
626  FCDD  68                      PLA                                                                   0000000
627  FCDE  4C ED FC                JMP D3                                                                0000000
628  FCE1  91 15          D1       STA (INTPTR),Y                                                        0000000
629  FCE3  C4 44                   CPY MAXPAX         HAVE WE HIT THE MAX?                               0000000
630  FCE5  F0 05                   BEQ D2             IF SO, END THE PACKET                              0000000
631  FCE7  E6 18                   INC DINTBC         DON'T END THE PACKET, WAIT FOR THE NEXT CHAR       0000000
632  FCE9  4C 30 FD                JMP RET                                                               0000000
633  FCEC  98             D2       TYA                TRANSFER BYTE COUNT TO ACC                         0000000
634  FCED  A0 07          D3       LDY #07                                                               0000000
635  FCEF  91 15                   STA (INTPTR),Y     STORE IN PACKET BYTE COUNT                         0000000
636  FCF1  A0 05                   LDY #05                                                               0000000
637  FCF3  A9 02                   LDA #DATMSG+TTY    STORE MESSAGE TYPE                                 0000000
638  FCF5  91 15                   STA (INTPTR),Y                                                        0000000
639  FCF7  A0 02                   LDY #02                                                               0000000
640  FCF9  AD F9 FF                LDA HOME           STORE XMIT ADDR                                    0000000
641  FCFC  91 15                   STA (INTPTR),Y                                                        0000000
642  FCFE  A0 00                   LDY #00                                                               0000000
643  FD00  A5 41                   LDA XADDR          STORE RECEIVER ADDR                                0000000
644  FD02  91 15                   STA (INTPTR),Y                                                        0000000
645  FD04  86 2D                   STX XSAVE          SAVE X                                             0000000
646  FD06  A2 01                   LDX #XDEV          BUMP THE BUFFER PTR                                0000000
647  FD08  20 64 FD                JSR BUMP                                                              0000000
648  FD0B  A2 08                   LDX #08            RESET DINTBC FOR NEXT MSG                          0000000
649  FD0D  86 18                   STX DINTBC                                                            0000000
650  FD0F  A6 2D                   LDX XSAVE          RESTORE X                                          0000000
651  FD11  4C 30 FD                JMP RET            AND RETURN                                         0000000
653  FD14                  ;                                                                             0000000
654  FD14                  ; TINT IS THE TIMER INTERRUPT HANDLER. ALL IT DOES IS INCREMENT               0000000
655  FD14                  ; TOD BY ONE AFTER EACH 1/4 SECOND.                                           0000000
656  FD14                  ;                                                                             0000000
657  FD14  AD 04 10       TINT     LDA TIMR1L         CLEAR THE INTERRUPT                                0000000
658  FD17  C6 43                   DEC TCOUNT         COUNT DOWN UNTIL 1/4 SECOND HIT                    0000000
659  FD19  D0 15                   BNE RET                                                               0000000
660  FD1B  A9 08                   LDA #08            RESET TCOUNT TO COUNT NEXT 1/4 SECOND              0000000
661  FD1D  85 43                   STA TCOUNT                                                            0000000
662  FD1F  18                      CLC                INCREMENT TOD                                      0000000
663  FD20  A5 24                   LDA TOD                                                               0000000
664  FD22  69 01                   ADC #01                                                               0000000
665  FD24  85 24                   STA TOD                                                               0000000
666  FD26  A5 25                   LDA TOD+1                                                             0000000
667  FD28  69 00                   ADC #00                                                               0000000
668  FD2A  85 25                   STA TOD+1                                                             0000000
669  FD2C  90 02                   BCC *+4                                                               0000000
670  FD2E  E6 26                   INC TOD+2                                                             0000000
```

```
CARD # LOC    CODE       CARD  10       20       30       40       50       60       70
 671   FD30              ;                                                              0000000
 672   FD30              ; RET IS USED TO RETURN FROM ALL INTERRUPTS.                   0000000
 673   FD30              ;                                                              0000000
 674   FD30   68         RET    PLA              UNSTACK AND RETURN                     0000000
 675   FD31   A8                TAY                                                     0000000
 676   FD32   68                PLA                                                     0000000
 677   FD33   40                RTI                                                     0000000
 678   FD34              ;                                                              0000000
 679   FD34              ; NMI OCCURS WHEN THE RECEIVE KEY TURNS OFF.                   0000000
 680   FD34              ;                                                              0000000
 681   FD34   48         NMI    PHA              PUSH A                                 0000000
 682   FD35   A9 57             LDA #%01010111   RESET NETWORK UART                     0000000
 683   FD37   8D 00 08          STA NUARTS                                              0000000
 684   FD3A   A9 D4             LDA #%11010100   INITIALIZE NETWORK UART                0000000
 685   FD3C   8D 00 08          STA NUARTS                                              0000000
 686   FD3F   A9 00             LDA #00          SET XMIT FLAG TO 0                     0000000
 687   FD41   85 1C             STA XMIT                                                0000000
 688   FD43   68                PLA                                                     0000000
 689   FD44   40                RTI                                                     0000000
 691   FD45              ;                                                              0000000
 692   FD45              ; SUBROUTINES FOLLOW. ACOMP IS USED TO DECIDE WHEN SENDING     0000000
 693   FD45              ; OUT PACKETS (IN EITHER DIRECTION) HAS CAUGHT UP WITH         0000000
 694   FD45              ; BUILDING THEM. IF IT HAS, PTRS ARE RESET TO INITIAL VALUES.  0000000
 695   FD45              ; ACOMP EXPECTS X TO BE EITHER 0, 2, OR 4.                     0000000
 696   FD45              ;                                                              0000000
 697   FD45   B5 0C      ACOMP  LDA PACNUM,X     GET # OF BUFFERS SENT OUT              0000000
 698   FD47   D5 0D             CMP PACNUM+1,X   IS IT SAME AS # OF BUFFERS TO SEND?    0000000
 699   FD49   D0 09             BNE ARET         NO                                     0000000
 700   FD4B   20 55 FD          JSR PINIT        YES, SO SET PTRS TO INITIAL VALUES     0000000
 701   FD4E   A9 00             LDA #00          AND CLEAR PACNUMS                      0000000
 702   FD50   95 0C             STA PACNUM,X                                            0000000
 703   FD52   95 0D             STA PACNUM+1,X                                          0000000
 704   FD54   60         ARET   RTS                                                     0000000
 705   FD55              ;                                                              0000000
 706   FD55              ; PINIT IS USED TO SET PTR PAIRS TO INITIAL VALUES. IT GETS THE 0000000
 707   FD55              ; INITIAL VALUES FROM THE STTAB TABLE. IT EXPECTS X TO BE      0000000
 708   FD55              ; 0, 2, OR 4.                                                  0000000
 709   FD55              ;                                                              0000000
 710   FD55   BD D4 FD   PINIT  LDA STTAB,X      GET DEFAULT VALUE FOR LOW HALF         0000000
 711   FD58   95 00             STA BUFL,X       STORE IN THE PTRS' LOW HALF            0000000
 712   FD5A   95 01             STA BUFL+1,X                                            0000000
 713   FD5C   BD D5 FD          LDA STTAB+1,X    GET DEFAULT VALUE FOR HIGH HALF        0000000
 714   FD5F   95 06             STA BUFH,X       STORE IN THE PTRS' HIGH HALF           0000000
 715   FD61   95 07             STA BUFH+1,X                                            0000000
 716   FD63   60                RTS                                                     0000000
 717   FD64              ;                                                              0000000
 718   FD64              ; BUMP IS USED TO INCREMENT THE # OF BUFFERS USED AND THE      0000000
 719   FD64              ; PTR TO THE NEXT BUFFER. IT EXPECTS THE OFFSET OF THE PTR     0000000
 720   FD64              ; TO BE USED TO BE IN X (0-5). THE INCREMENT TO BUMP BY        0000000
 721   FD64              ; IS CONTAINED IN THE MAXPAX TABLE.                            0000000
 722   FD64              ;                                                              0000000
 723   FD64   8A         BUMP   TXA              COPY THE INDEX TO A                    0000000
 724   FD65   4A                LSR A            DIVIDE BY 2 FOR INDEX INTO MAXPAX      0000000
 725   FD66   A8                TAY              COPY INTO Y                            0000000
 726   FD67   F6 0C             INC PACNUM,X     INCR # OF BUFFERS USED                 0000000
 727   FD69   18                CLC              CLEAR CARRY FOR ADDITION               0000000
 728   FD6A   B5 00             LDA BUFL,X       GET THE LOW PART OF THE ADDR           0000000
 729   FD6C   79 44 00          ADC MAXPAX,Y     ADD THE INCREMENT                      0000000
 730   FD6F   95 00             STA BUFL,X       STORE THE LOW PART                     0000000
 731   FD71   90 02             BCC BRET         WAS THERE A CARRY TO THE HIGH PART?    0000000
 732   FD73   F6 06             INC BUFH,X       YES                                    0000000
 733   FD75   60         BRET   RTS                                                     0000000
 734   FD76              ;                                                              0000000
 735   FD76              ; BCONST IS USED TO CONSTRUCT A BIU-GENERATED MESSAGE.         0000000
 736   FD76              ; IT EXPECTS THE MESSAGE TYPE TO BE PASSED IN X.               0000000
 737   FD76              ;                                                              0000000
 738   FD76   A5 11      BCONST LDA PACNUM+BIUCRE IS THERE ROOM FOR ANOTHER BIU-CREATED PACKET?0000000
 739   FD78   CD D1 FD          CMP NBBUF                                               0000000
 740   FD7B   90 0B             BCC BOK          YES                                    0000000
 741   FD7D   8A                TXA              NO, SO HAVE TO XMIT ALREADY-CREATED MSGS 0000000
 742   FD7E   48                PHA              SAVE THE PARAMETER                     0000000
 743   FD7F   20 56 F9   BLOOP  JSR NET          TRY TO SEND A PACKET                   0000000
 744   FD82   A5 11             LDA PACNUM+BIUCRE WERE ALL THE PACKETS SENT?            0000000
 745   FD84   D0 F9             BNE BLOOP        NO, SO KEEP ON TRYING                  0000000
 746   FD86   68                PLA              RESTORE THE PARAMETER                  0000000
 747   FD87   AA                TAX                                                     0000000
 748   FD88   A5 05      BOK    LDA BUFL+BIUCRE  GET THE PTR TO THE NEXT BIU BUFFER     0000000
 749   FD8A   85 19             STA BIUPTR                                              0000000
 750   FD8C   A5 0B             LDA BUFH+BIUCRE                                         0000000
 751   FD8E   85 1A             STA BIUPTR+1                                            0000000
 752   FD90   A9 07             LDA #07          DEFAULT PACKET LENGTH OF 7             0000000
 753   FD92   A8                TAY                                                     0000000
 754   FD93   91 19             STA (BIUPTR),Y   STORE IT IN THE PACKET                 0000000
 755   FD95   A0 00             LDY #00                                                 0000000
 756   FD97   A5 41             LDA XADDR        STORE THE RECEIVE ADDRESS              0000000
 757   FD99   91 19             STA (BIUPTR),Y                                          0000000
 758   FD9B   A0 02             LDY #02                                                 0000000
 759   FD9D   AD F9 FF          LDA HOME         STORE THE XMIT ADDRESS                 0000000
```

```
CARD # LOC    CODE    CARD  10      20      30      40      50      60    70
760   FDA0   91 19          STA (BIOPTR),Y
761   FDA2   A0 05          LDY #05
762   FDA4   8A             TXA
763   FDA5   91 19          STA (BIOPTR),Y  STORE THE MESSAGE TYPE
764   FDA7   60             RTS
765   FDA8                ;
766   FDA8                ; PUTSTR IS USED TO PRINT A STRING FROM THE ASCII STRING LIST.
767   FDA8                ; IT EXPECTS THE OFFSET OF THE STRING FROM THE BEGINNING OF
768   FDA8                ; ASCII IN Y.
769   FDA8                ;
770   FDA8   AD 00 0C  PUTSTR  LDA DUARTS
771   FDAB   29 02           AND #%00000010
772   FDAD   F0 F9           BEQ PUTSTR
773   FDAF   B9 F2 FD        LDA ASCII,Y
774   FDB2   C9 00           CMP #00         ARE WE AT THE END OF THE STRING?
775   FDB4   F0 07           BEQ P0          YES, SO RETURN
776   FDB6   8D 01 0C        STA DUARTD
777   FDB9   C8              INY
778   FDBA   4C A8 FD        JMP PUTSTR
779   FDBD   60         P0   RTS
780   FDBE                ;
781   FDBE                ; STIMER SETS A TIMER VARIABLE TO AN INCREMENT PLUS THE CURRENT
782   FDBE                ; VALUE OF TOD. A IS THE INCREMENT TO ADD TO TOD AND X POINTS TO
783   FDBE                ; THE VARIABLE THAT HOLDS THE RESULT, LOW BYTE FIRST.
784   FDBE                ;
785   FDBE   18        STIMER  CLC
786   FDBF   65 24           ADC TOD         ADD TOD TO THE INCR IN A
787   FDC1   95 00           STA 0,X         SAVE IT IN THE LOW RESULT BYTE
788   FDC3   A5 25           LDA TOD+1       ADD IN THE CARRY
789   FDC5   69 00           ADC #00
790   FDC7   95 01           STA 1,X         SAVE IT IN THE SECOND BYTE
791   FDC9   A5 26           LDA TOD+2
792   FDCB   69 00           ADC #00
793   FDCD   95 02           STA 2,X         AND IN THE HIGH BYTE
794   FDCF   60              RTS
796   FDD0                ;
797   FDD0                ; CONSTANTS AND TABLES FOLLOW
798   FDD0                ;
799   FDD0   5D        NRBUF   .BYTE 93      93 RECEIVE BUFFERS DEFINED
800   FDD1   03        NBBUF   .BYTE 3       3 BIU-CREATED BUFFERS DEFINED
801   FDD2   0C        BCPBUF  .BYTE 12      12 BYTES PER RECEIVE BUFFER
802   FDD3   2A        BCBBUF  .BYTE 42      42 BYTES PER BIU-CREATED BUFFER
803   FDD4                ;
804   FDD4                ; STTAB CONTAINS THE STARTING ADDRESSES OF THE BUFFER POOLS.
805   FDD4                ;
806   FDD4   00        STTAB   .BYTE $00     BEGINNING OF XMIT BUFFERS
807   FDD5   06                .BYTE $06
808   FDD6   00                .BYTE $00     BEGINNING OF RECEIVE BUFFERS
809   FDD7   02                .BYTE $02
810   FDD8   80                .BYTE $80     BEGINNING OF BIU-CREATED BUFFERS
811   FDD9   07                .BYTE $07
812   FDDA                ;
813   FDDA                ; SYSTEM TABLE FOLLOWS. IT HAS EACH SYSTEM NAME, ITS DESTINATION
814   FDDA                ; ADDRESS, THE MAXIMUM PACKET SIZE FOR THAT SYSTEM, AND THE
815   FDDA                ; NUMBER OF XMIT BUFFERS DEFINED.
816   FDDA                ;
817   FDDA   54 45 52  TESTER  .BYTE 'TER'   "TERMX", WHERE X IS THE TERMINAL DA
818   FDDD   00                .BYTE $00,08,42  1 DATA BYTE MAX, 42 XMIT BUFFERS
818   FDDE   08
818   FDDF   2A
819   FDE0   49 42 4D          .BYTE 'IBM'   THE IBM FACILITY WHEN IT COMES
820   FDE3   01                .BYTE $01,11,32  DA OF 01, 4 DATA BYTES, 32 BUFFERS
820   FDE4   0B
820   FDE5   20
821   FDE6   49 50 52          .BYTE 'IPR'   INTERIM PATIENT REGISTRATION SYSTEM
822   FDE9   02                .BYTE $02,127,3  DA OF 02, 4 DATA BYTES, 32 BUFFERS
822   FDEA   7F
822   FDEB   03
823   FDEC   42 41 43          .BYTE 'BAC'   BACKBOARD
824   FDEF   BB                .BYTE $BB,8,42   DA OF BB, 1 DATA BYTE, 42 BUFFERS
824   FDF0   08
824   FDF1   2A
826   FDF2                ;
827   FDF2                ; THE STRING TABLE FOLLOWS BELOW. EACH STRING HAS A SYMBOLIC OFFSET.
828   FDF2                ;
829   FDF2           WHSYS    = 0            CLEAR SCREEN AND "WHICH SYSTEM"
830   FDF2                ;
831   FDF2   1B        ASCII   .BYTE $1B,$58
831   FDF3   58
832   FDF4   1B                .BYTE $1B,$48
832   FDF5   48
833   FDF6   1B                .BYTE $1B,$52
833   FDF7   52
834   FDF8   57 45             .BYTE 'WELCOME TO THE WRAMC NETWORK'
834   FDFA   4C 43
834   FDFC   4F 4D
834   FDFE   45 20
834   FE00   54 4F
834   FE02   20 54
```

```
CARD # LOC    CODE     CARD    10        20        30        40        50        60        70
 834   FE04   48 45
 834   FE06   20 57
 834   FE08   52 41
 834   FE0A   4D 43
 834   FE0C   20 4E
 834   FE0E   45 54
 834   FE10   57 4F
 834   FE12   52 4B
 835   FE14   0D                      .BYTE $0D,$0A
 835   FE15   0A
 836   FE16   46 49                   .BYTE 'FIRST PUT TERMINAL IN "KSR MODE"'
 836   FE18   52 53
 836   FE1A   54 20
 836   FE1C   50 55
 836   FE1E   54 20
 836   FE20   54 45
 836   FE22   52 4D
 836   FE24   49 4E
 836   FE26   41 4C
 836   FE28   20 49
 836   FE2A   4E 20
 836   FE2C   22 4B
 836   FE2E   53 52
 836   FE30   20 4D
 836   FE32   4F 44
 836   FE34   45 22
 837   FE36   0D                      .BYTE $0D,$0A
 837   FE37   0A
 838   FE38   41 4E                   .BYTE 'AND THEN ENTER NAME OF DESIRED NETWORK SERVICE'
 838   FE3A   44 20
 838   FE3C   54 48
 838   FE3E   45 4E
 838   FE40   20 45
 838   FE42   4E 54
 838   FE44   45 52
 838   FE46   20 4E
 838   FE48   41 4D
 838   FE4A   45 20
 838   FE4C   4F 46
 838   FE4E   20 44
 838   FE50   45 53
 838   FE52   49 52
 838   FE54   45 44
 838   FE56   20 4E
 838   FE58   45 54
 838   FE5A   57 4F
 838   FE5C   52 4B
 838   FE5E   20 53
 838   FE60   45 52
 838   FE62   56 49
 838   FE64   43 45
 839   FE66                  ;
 840   FE66           CRLF   = *-ASCII        CARRIAGE RETURN, LINE FEED           0000000
 841   FE66   0D              .BYTE  $0D                                          0000000
 842   FE67                  ;
 843   FE67           LF     = *-ASCII        LINE FEED ALONE                     0000000
 844   FE67   0A              .BYTE  $0A,00                                       0000000
 844   FE68   00
 845   FE69                                                                       0000000
 846   FE69           KBDIS  =*-ASCII         KEYBOARD DISABLE MESSAGE
 847   FE69   1B              .BYTE  $1B,$45,00
 847   FE6A   45
 847   FE6B   00
 848   FE6C                  ;
 849   FE6C           LINKT  = *-ASCII        LINK TERMINATED MESSAGE              0000000
 850   FE6C   4C 49           .BYTE 'LINK TERMINATED'                             0000000
 850   FE6E   4E 4B
 850   FE70   20 54
 850   FE72   45 52
 850   FE74   4D 49
 850   FE76   4E 41
 850   FE78   54 45 44
 851   FE7B   0D              .BYTE $0D,$0A,00                                    0000000
 851   FE7C   0A
 851   FE7D   00
 852   FE7E                  ;                                                    0000000
 853   FE7E           LINKR1 = *-ASCII        LINK REQUEST MESSAGE                 0000000
 854   FE7E   4C 49           .BYTE 'LINK REQUEST FROM '                          0000000
 854   FE80   4E 4B
 854   FE82   20 52
 854   FE84   45 51
 854   FE86   55 45
 854   FE88   53 54
 854   FE8A   20 46
 854   FE8C   52 4F
 854   FE8E   4D 20
 855   FE90   00              .BYTE $00                                           0000000
 856   FE91                  ;
```

```
CARD # LOC    CODE      CARD    10         20         30         40         50         60         70
857    FE91             LINKTO  = *-ASCII                                                            0000000
858    FE91  48 49              .BYTE 'HIT RESET ON BIU FOR NETWORK SERVICE'                         0000000
858    FE93  54 20
858    FE95  52 45
858    FE97  53 45
858    FE99  54 20
858    FE9B  4F 4E
858    FE9D  20 42
858    FE9F  49 55
858    FEA1  20 46
858    FEA3  4F 52
858    FEA5  20 4E
858    FEA7  45 54
858    FEA9  57 4F
858    FEAB  52 49
858    FEAD  20 53
858    FEAF  45 52
858    FEB1  56 49
858    FEB3  43 45
859    FEB5  0D                 .BYTE $0D,$0A,00                                                     0000000
859    FEB6  0A
859    FEB7  00
860    FEB8                ;                                                                         0000000
861    FEB8            LINKA   = *-ASCII       LINK ACCEPTED MESSAGE                                 0000000
862    FEB8  4C 49              .BYTE 'LINK ACCEPTED'                                                0000000
862    FEBA  4E 4B
862    FEBC  20 41
862    FEBE  43 43
862    FEC0  45 50
862    FEC2  54 45 44
863    FEC5  0D                 .BYTE $0D,$0A,00                                                     0000000
863    FEC6  0A
863    FEC7  00
864    FEC8                ;
865    FEC8            NOVAIL  = *-ASCII       SYSTEM NOT AVAILABLE MESSAGE                          0000000
866    FEC8  53 59              .BYTE 'SYSTEM NOT AVAILABLE'                                         0000000
866    FECA  53 54
866    FECC  45 4D
866    FECE  20 4E
866    FED0  4F 54
866    FED2  20 41
866    FED4  56 41
866    FED6  49 4C
866    FED8  41 42
866    FEDA  4C 45
867    FEDC  0D                 .BYTE $0D,$0A,00                                                     0000000
867    FEDD  0A
867    FEDE  00
868    FEDF                ;                                                                         0000000
869    FEDF                ; INTERRUPT VECTORS BELOW                                                  0000000
870    FEDF                ;                                                                          0000000
871    FEDF                        *=$FFF9                                                            0000000
872    FFF9  31         HOME    .BYTE '1'          HOME ADDRESS                                      0000000
873    FFFA  34 FD              .WORD NMI          NON-MASKABLE INTERRUPT VECTOR                     0000000
874    FFFC  00 F8              .WORD RESET        RESET VECTOR                                      0000000
875    FFFE  00 FC              .WORD IRQ          IRQ VECTOR                                        0000000
876    0000                ;                                                                          0000000
877    0000                        .END                                                               0000000
```

We claim:

1. An unslotted multiple access bus communications system comprising:

a communications bus including a pair of oppositely-directed, unidirectional signal paths connecting a plurality of remote locations, and a path coupling means for transferring signals from the inbound path to the outbound path at one end of said pair of paths, a plurality of bus interface units (BIU's), each one of said BIU's being coupled to said bus at an associated one of said remote locations, and including:

A. means for identifying times when no carrier signal is present on said outbound path, B. means for selectively transmitting modulated carrier signals on said inbound path, wherein the carrier modulation for each of said modulated carrier signals is representative of a data packet, said data packet including at least a portion of an addressed message to be transmitted, said transmitting means being operative to commence a modulated signal carrier transmission only during said identified times, C. means for receiving modulated carrier signals from said outbound path, D. means for monitoring said received modulated carrier signals, said monitoring means being operative during a collision window, said collision window, commencing at least as early as $t_1$ from the time when said transmitter means initiates a transmission on said inbound path, and extending until at least $t_2$ after said transmission initiation time, where $t_1$ equals the signal propagation time along said inbound path, said path coupling means, and said outbound path from the location of said one BIU back to said one BIU and $t_2$ equals the signal propagation time along said inbound path, said path coupling means, and said outbound path from the location of the BIU farthest from said path coupling means back to the location of said one BIU, E. transmitter control means responsive to said monitoring means for disabling said transmitting means immediately when at least a portion of said monitored signals fail to correspond to a corresponding portion of the modulated carrier signal of said transmission, and for disabling said transmitting means following the complete transmission of said modulated carrier signal otherwise.

2. A system according to claim 1 wherein each of said BIU's has an associated address and said data packet includes data representative of the address of the BIU intended to receive said packet, and wherein said receiving means of at least one BIU further includes means for identifying and storing data signals representative of the modulation on said received modulated carrier signals including a portion corresponding to the address of said one BIU.

3. A system according to claim 1 wherein said transmitting means of at least one BIU includes means for receiving and buffering one or more data packets for transmission.

4. A system according to claim 1 wherein said transmitting means is operative to again commence a modulated signal carrier transmission following detection of a signal correspondence failure by said transmitter control means at a time delayed from the previous transmission time of said modulated carrier signal by a random interval.

5. An unslotted multiple access bus communications system comprising:
- a communications bus including a pair of oppositely-directed, unidirectional signal paths connecting a plurality of remote locations, and a path coupling means for transferring signals from the inbound path to the outbound path at one end of said pair of paths,
- a plurality of bus interface units (BIU's), each one of said BIU's being coupled to said bus at an associated one of said remote locations, and including:
  A. bus activity monitor means for identifying times when no carrier signal is present on said outbound path,
  B. transmitter control means,
  C. transmitter means responsive to said transmitter control means, said transmitter means including means for transmitting a modulated carrier signal on said inbound path, wherein said carrier modulation for each of said modulated carrier signals is representative of a data packet, said packet including a header portion having a least a portion representative of an address word associated with the location of the transmitting BIU and at least a portion representative of an address word associated with the location of the BIU intended to receive said packet, said portions together having a duration at least equal to the signal propagation time along said inbound path, along said path coupling means, and along said outbound path from the location of the BIU farthest from said path coupling means back to said farthest BIU,
  D. receiver means for receiving modulated carrier signals on said outbound path and for detecting the modulation on said carrier,
  E. collision detection means operative during a collision window to compare said detected modulation with said packet header portion representative of the transmitting and intended receiver BIU's address words,
  said transmitter control means being operative to activate said transmitter means only during said identified times, and being responsive to said collision detection means to disable said transmitter means following reception of said packet in its entirety by said receiver means when said detected modulation and said packet header portion match, and to disable said transmitter means immediately when said detected modulation and said packet portion fail to match,
  said collision window commencing at least as early as $t_1$ from the time when said transmitter means initiates transmission on said inbound path, and extending until at least $t_2$ after said transmission initiation time, where $t_1$ equals the signal propagation time along said inbound path, said path coupling means, and said outbound path from the location of said one BIU back to said one BIU, and $t_2$ equals the signal propagation time along said inbound path, said path coupling means, and said outbound path from the location of the BIU farthest from said path coupling means back to the location of said one BIU.

6. A system according to claim 5 further comprising:
  F. packet receiver means to identify said detected modulation as a received packet when said detected modulation includes a header portion representative of said address word associated with its location.

7. A system according to claim 5 wherein transmitter control means is operative following detection of a match failure to activate said transmitter means to again transmit a modulated carrier signal at a time delayed from the previous transmission time for said modulated carrier signal by a random interval.

8. A bus interface unit (BIU) for an unslotted multiple access bus communications system having a communications bus including a pair of oppositely-directed, unidirectional signal paths connecting a plurality of remote locations, and a path coupling means for transferring signals from the inbound path to the outbound path at one end of said pair of paths, said BIU being adapted for coupling to said bus at an associated one of said remote locations, and comprising:
  A. means for identifying times when no carrier signal is present on said outbound path,
  B. means for selectively transmitting modulated carrier signals on said inbound path, wherein the carrier modulation for each of said modulated carrier signals is representative of a data packet, said data packet including at least a portion of an addressed message to be transmitted, said transmitting means being operative to commence a modulated signal carrier transmission only during said identified times,
  C. means for receiving modulated carrier signals from said outbound path,
  D. means for monitoring said received modulated carrier signals, said monitoring means being operative during a collision window, said collision window, commencing at least as early as t1 from the time when said transmitter means initiates a transmission on said inbound path, and extending until at least t2 after said transmission initiation time, where t1 equals the signal propagation time along said inbound path, said path coupling means, and said outbound path from the location of said BIU back to said BIU and t2 equals the signal propagation time along said inbound path, said path coupling means, and said outbound path from the location of the one of said remote locations farthest from said path coupling means back to the location of said BIU, E. transmitter control means responsive to said monitoring means for disabling said transmitting means immediately when at least a portion of said monitored signals fail to correspond to a corresponding portion of the modulated carrier signal of said transmission, and for disabling said transmitting means following the complete transmission of said modulated carrier signal otherwise.

9. A BIU according to claim 8 wherein said BIU has an associated address and said data packet includes data representative of the address associated with the remote location intended to receive said packet, and wherein said receiving means of said BIU further includes means for identifying and storing data signals representative of the modulation on said received modulated carrier signals including a portion corresponding to the address of said BIU.

10. A BIU according to claim 8 wherein said transmitting means of said BIU includes means for receiving and buffering one or more data packets for transmission.

11. A BIU according to claim 8 wherein said transmitting means is operative to again commence a modulated signal carrier transmission following detection of a signal correspondence failure by said transmitter control means at a time delayed from the previous transmission time of said modulated carrier signal by a random interval.

12. A bus interface unit (BIU) for an unslotted multiple access bus communications system having a communications bus including a pair of oppositely-directed, unidirectional signal paths connecting a plurality of remote locations, and a path coupling means for transferring signals from the inbound path to the outbound path at one end of said pair of paths, said BIU being adapted for coupling to said bus at an associated one of said remote locations, and comprising:

A. bus activity monitor means for identifying times when no carrier signal is present on said outbound path, B. transmitter control means, C. transmitter means responsive to said transmitter control means, said transmitter means including means for transmitting a modulated carrier signal on said inbound path, wherein said carrier modulation for each of said modulated carrier signals is representative of a data packet, said packet including a header portion having at least a portion representative of an address word associated with the location of said BIU and at least a portion representative of an address word associated with the remote location intended to receive said packet, said portions together having a duration at least equal to the signal propagation time along said inbound path, along said path coupling means, and along said outbound path from the location of the remote location farthest from said path coupling means back to said farthest remote location, D. receiver means for receiving modulated carrier signals on said outbound path and for detecting the modulation on said carrier, E. collision detection means operative during a collision window to compare said detected modulation with said packet header portion representative of the transmitting and intended receiving location's address words, said transmitter control means being operative to activate said transmitter means only during said identified times, and being responsive to said collision detection means to disable said transmitter means following reception of said packet in its entirety by said receiver means when said detected modulation and said packet header portion match, and to disable said transmitter means immediately when said detected modulation and said packet portion fail to match, said collision window commencing at least as early as t1 from the time when said transmitter means initiates transmission on said inbound path, and extending until at least t2 after said transmission initiation time, where t1 equals the signal propagation time along said inbound path, said path coupling means, and said outbound path from the location of said BIU back to said BIU, and t2 equals the signal propagation time along said inbound path, said path coupling means, and said outbound path from one of said remote locations farthest from said path coupling means back to the location of said BIU.

13. A BIU according to claim 12 further comprising:

F. packet receiver means to identify said detected modulation as a received packet when said detected modulation includes a header portion representative of said address word associated with its location.

14. A BIU according to claim 12 wherein transmitter control means is operative following detection of a match failure to activate said transmitter means to again transmit a modulated carrier signal at a time delayed from the previous transmission time for said modulated carrier signal by a random interval.

* * * * *